(12) United States Patent
Long et al.

(10) Patent No.: US 12,035,707 B2
(45) Date of Patent: Jul. 16, 2024

(54) SYSTEM AND METHOD FOR PERFORMING SPRAYING OPERATIONS WITH AN AGRICULTURAL APPLICATOR

(71) Applicant: CNH Industrial America LLC, New Holland, PA (US)

(72) Inventors: Scott Allen Long, Plainfield, IL (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 359 days.

(21) Appl. No.: 17/483,092

(22) Filed: Sep. 23, 2021

(65) Prior Publication Data

US 2023/0090714 A1 Mar. 23, 2023

(51) Int. Cl.
*A01M 7/00* (2006.01)
*B05B 12/12* (2006.01)
*G01C 21/00* (2006.01)
*G05D 1/00* (2006.01)

(52) U.S. Cl.
CPC ........ *A01M 7/0089* (2013.01); *A01M 7/0042* (2013.01); *B05B 12/122* (2013.01); *G01C 21/3826* (2020.08); *G05D 1/0219* (2013.01); *G05D 1/0287* (2013.01)

(58) Field of Classification Search
CPC . A01M 7/0089; A01M 7/0042; B05B 12/122; B05B 1/20; G01C 21/3826; G05D 1/0219; G05D 1/0287; G05D 2201/0201; A01B 76/00
USPC ..................................................... 701/25, 50
See application file for complete search history.

(56) References Cited

U.S. PATENT DOCUMENTS

| | | |
|---|---|---|
| 10,548,306 B2 | 2/2020 | Albert et al. |
| 10,713,484 B2 | 7/2020 | Polzounov et al. |
| 10,939,607 B2 | 3/2021 | Hoffmann et al. |

(Continued)

FOREIGN PATENT DOCUMENTS

| | | | | |
|---|---|---|---|---|
| AU | 2021200024 A1 | * | 8/2021 | ........... A01B 79/005 |
| AU | 2021200338 A1 | * | 8/2021 | ........... A01B 79/005 |

(Continued)

OTHER PUBLICATIONS

Liang et al. (CN111813155 A), CN111813155.translate.English, Target spraying system control method and device based on fuzzy PID and storage medium. (Year: 2020).*

(Continued)

*Primary Examiner* — B M M Hannan
(74) *Attorney, Agent, or Firm* — Rickard K. DeMille; Rebecca L. Henkel; Peter K. Zacharias

(57) ABSTRACT

A system for an agricultural operation includes a first vehicle having an object sensor configured to capture data associated with one or more objects within the field and a location sensor configured to capture data associated with a location of each of the one or more objects. A computing system is communicatively coupled with the object sensor and the location sensor. The computing system is configured to identify at least one of the one or more objects as a weed, classify each of the identified weeds in a first set of weeds or a second set of weeds, and generate a weed map based on the classification of each of the first set of weeds and the second set of weeds.

20 Claims, 14 Drawing Sheets

(56) References Cited

U.S. PATENT DOCUMENTS

| | | | | |
|---|---|---|---|---|
| 2016/0150771 | A1* | 6/2016 | Tollefsrud | G01F 23/18 |
| | | | | 206/459.1 |
| 2017/0318743 | A1* | 11/2017 | Sauder | A01C 7/102 |
| 2019/0343107 | A1* | 11/2019 | Tollefsrud | B60K 15/00 |
| 2019/0362146 | A1* | 11/2019 | Polzounov | G06N 3/045 |
| 2020/0214281 | A1 | 7/2020 | Koch et al. | |
| 2020/0240904 | A1* | 7/2020 | Harlow | B05B 12/08 |
| 2020/0242754 | A1* | 7/2020 | Peters | G06Q 50/02 |
| 2021/0022283 | A1 | 1/2021 | Vandike et al. | |
| 2021/0056338 | A1* | 2/2021 | Padwick | G06T 7/11 |
| 2021/0078853 | A1* | 3/2021 | Long | B67D 7/145 |
| 2021/0243936 | A1* | 8/2021 | Vandike | A01B 69/004 |
| 2021/0243938 | A1* | 8/2021 | Blank | A01M 7/0089 |
| 2022/0183267 | A1* | 6/2022 | Janssen | A01M 21/043 |
| 2022/0192174 | A1* | 6/2022 | Humpal | B05B 12/124 |
| 2022/0232816 | A1* | 7/2022 | Vandike | A01C 7/046 |
| 2022/0256834 | A1* | 8/2022 | Lopes Agnese | A01M 21/04 |
| 2022/0327815 | A1* | 10/2022 | Picon Ruiz | G06T 7/001 |
| 2023/0060628 | A1* | 3/2023 | Schleicher | G05D 1/0094 |
| 2023/0136009 | A1* | 5/2023 | Faers | A01M 21/043 |
| | | | | 47/1.7 |
| 2023/0165235 | A1* | 6/2023 | Adam | A01N 25/00 |
| | | | | 382/110 |

FOREIGN PATENT DOCUMENTS

| | | | | |
|---|---|---|---|---|
| CN | 107792366 A | | 3/2018 | |
| CN | 108513768 A | * | 9/2018 | A01C 7/00 |
| CN | 111813155 A | * | 10/2020 | |
| CN | 113207410 A | * | 8/2021 | A01B 79/005 |
| DE | 102022207537 A1 | * | 3/2023 | A01B 69/008 |
| EP | 3861842 A1 | * | 8/2021 | A01B 79/005 |
| WO | WO-2019081375 A1 | * | 5/2019 | A01M 1/026 |
| WO | WO 2020/035316 A1 | | 2/2020 | |
| WO | WO-2020201046 A1 | * | 10/2020 | A01M 21/00 |
| WO | WO-2021190966 A1 | * | 9/2021 | A01C 14/00 |
| WO | WO-2021198860 A1 | * | 10/2021 | A01M 7/0089 |
| WO | WO-2021211718 A1 | * | 10/2021 | A01B 79/005 |

OTHER PUBLICATIONS

Yanlei Xu, et al., "A Real-Time Weed Mapping and Precision Herbicide Spraying System for Row Crops," published online Dec. 3, 2018, doi:10.3390/s18124245 (17 pages) hopps://www.ncbi.nlm.nih.gov/pmc/articles/PMC6308525/.

Joseph E. Hunter, III, et al., "Integration of remote-weed mapping and an autonomous spraying unmanned aerial vehicle for site-specific weed management," Published online Nov. 12, 2019, doi: 10.1002/ps.5651 (12 pages) https://www.ncbi.nlm.nih.gov/pmc/articles/PMC7064951/.

Sheng Wen, et al., "Design and Experiment of a Variable Spray System for Unmanned Aerial Vehicles Based on PID and PWM Control," Applied Sciences, Article, published Dec. 3, 2018, doi:10.3390 (22 pages).

Huasheng Huang, et al., "Accurate Weed Mapping and Prescription Map Generation Based on Fully Convolutional Networks Using UAV Imagery," published online Oct. 1, 2018 doi: 10.3390/s18103299 (13 pages) https://www.ncbi.nlm.nih.gov.pmc/articles/PMC6209949/.

\* cited by examiner

SYSTEM AND METHOD FOR PERFORMING SPRAYING OPERATIONS WITH AN AGRICULTURAL APPLICATOR

FIELD

The present disclosure generally relates to agricultural applicators for performing spraying operations within a field and, more particularly, to systems and methods for performing spraying operations with an agricultural sprayer, such as spraying operations that allow for selective application of an agricultural product onto an underlying field.

BACKGROUND

Agricultural sprayers apply an agricultural product (e.g., a pesticide, a nutrient, and/or the like) onto crops and/or a ground surface as the sprayer is traveling across a field. To facilitate such travel, sprayers can be configured as self-propelled vehicles or implements towed behind an agricultural tractor or another suitable work vehicle. In some instances, the sprayer includes an outwardly extending boom assembly having a plurality of boom sections supporting a plurality of spaced-apart nozzle assemblies. Each nozzle assembly has a valve configured to control the spraying of the agricultural product through a nozzle onto underlying targets, which may include crops and/or weeds.

Some sprayers may control the flow of agricultural product through individual nozzles based on data received from sensors mounted on the boom sections that detect one or more field conditions (e.g., crops, weeds, moisture content, etc.). However, various portions of a field may generally include various types of weeds in which a variation in the agricultural product may better treat each of the various types of weeds.

Accordingly, an improved system and method performing spraying operations with various agricultural products would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural operation. The system includes a first vehicle having an object sensor configured to capture data associated with one or more objects within a field and a location sensor configured to capture data associated with a location of each of the one or more objects. A computing system is communicatively coupled with the object sensor and the location sensor. The computing system is configured to identify at least one of the one or more objects as a weed; classify each of the identified weeds in a first set of weeds or a second set of weeds; and generate a weed map based on the classification of each of the first set of weeds and the second set of weeds, wherein the weed map includes a first region associated with the first set of weeds and a second region associated with the second set of weeds, and wherein the first region includes at least a first minimum threshold of a first type of weed and the second region includes at least a second minimum threshold of a second type of weed.

In some aspects, the present subject matter is directed to a method for selectively applying an agricultural product. The method includes detecting, with a computing system, one or more objects and a location of the one or more objects in an agricultural field. The method also includes identifying, with the computing system, at least one of the one or more objects as a weed. The method further includes classifying, with the computing system, each of the identified weeds in a first set of weeds or a second set of weeds. In addition, the method includes generating, with the computing system, a calculated volume of a first agricultural product needed to dispense the first agricultural product on each target within the first set of weeds. Lastly, the method includes displaying, with a user interface, the calculated volume of the first agricultural product.

In some aspects, the present subject matter is directed to a system for an agricultural operation is disclosed. The system includes a first vehicle having an object sensor configured to capture data associated with one or more objects within a field and a terrain sensor configured to capture data associated with a location of each of the one or more objects. A computing system is communicatively coupled with the object sensor and the location sensor. The computing system is configured to identify at least one of the one or more objects as an identified weed; classify each of the identified weeds in a first set of weeds or a second set of weeds based on a terrain condition proximate to the detected weed; and generate a weed map based on the classification of each of the first set of weeds and the second set of weeds, wherein the weed map includes a first region associated with the first set of weeds and a second region associated with the second set of weeds.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
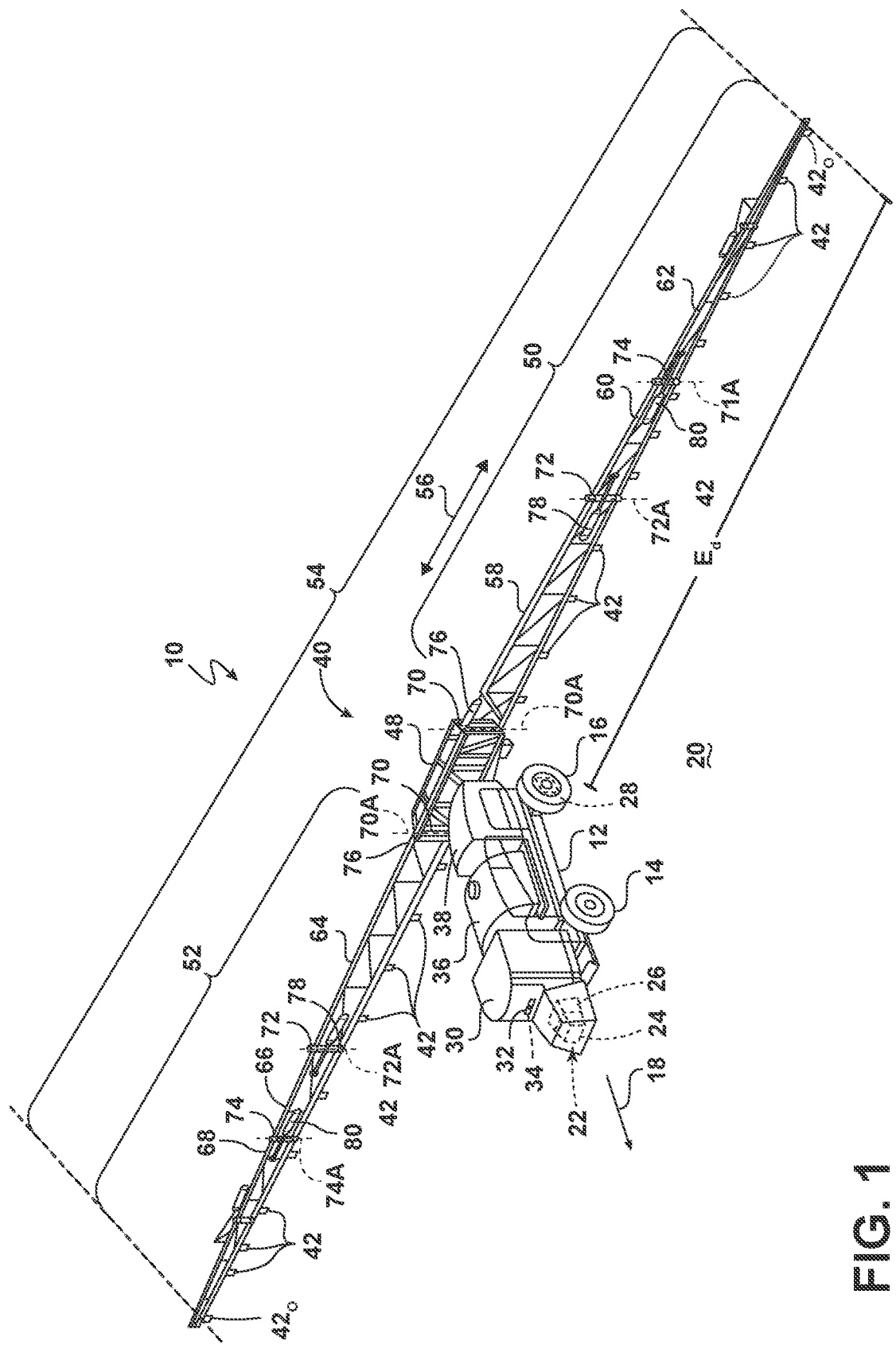
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for an agricultural operation that includes a first work vehicle that may be used to detect one or more targets within the field during a first operation and a second vehicle that may apply an agricultural product to each target during a second operation. In various examples, the first vehicle may be configured to perform at least one of a planting process, seeding process, a tilling process, or a harvesting process during the operation of the first vehicle. The second vehicle may be configured as an agricultural applicator (e.g., a sprayer) that includes a boom assembly having one or more nozzle assemblies positioned along the boom assembly.

In some instances, the first vehicle may have an object sensor configured to capture data associated with one or more objects within the field and a location sensor configured to capture data associated with a location of each of the one or more objects. In addition, the first vehicle can further include a terrain sensor.

A computing system is communicatively coupled with the object sensor, the location sensor, and the terrain sensor. The computing system can be configured to identify at least one of the one or more objects as a weed and classify each of the identified weeds in a first set of weeds or a second set of weeds. The computing system may be configured to analyze/process the data to detect/identify the type and location of various objects in the field. Additionally or alternatively, in some instances, the computing system may classify each of the identified weeds in a first set of weeds or a second set of weeds based in part on data received from the terrain sensor.

In addition, the computing system may generate a weed map based on the classification of each of the first set of weeds and the second set of weeds. The weed map can include a first region associated with the first set of weeds and a second region associated with the second set of weeds. In some examples, the first region includes at least a first minimum threshold of a first type of weed and the second region includes at least a second minimum threshold of a second type of weed.

In various examples, a first agricultural product can be configured to be deposited on the first set of weeds within the first region from the one or more nozzle assemblies and a second agricultural product is configured to be deposited on the second set of weeds within the second region from the one or more nozzle assemblies during operation of the second vehicle.

Figure 2:
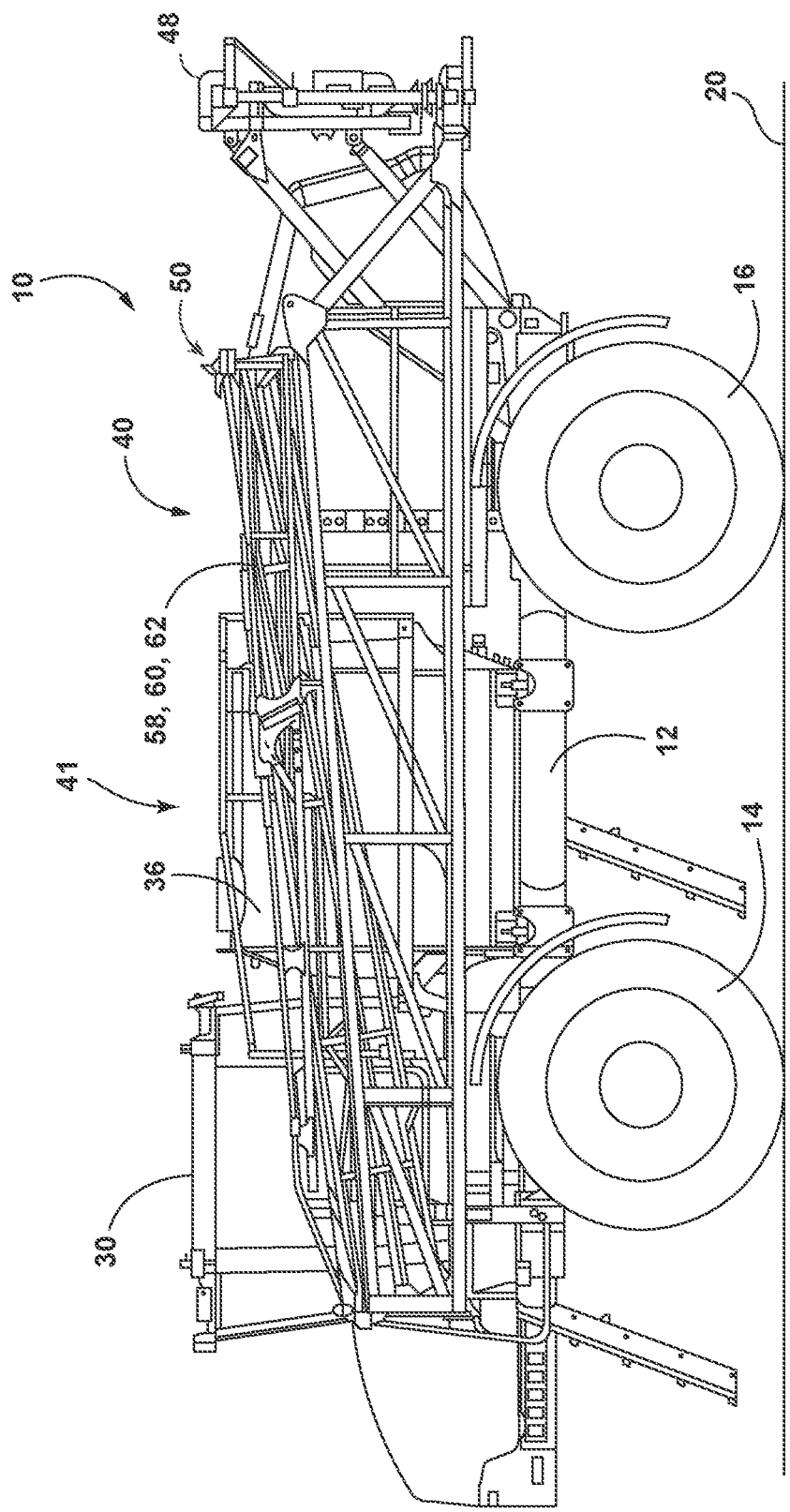
FIG. 2 illustrates a side view of the agricultural sprayer in accordance with aspects of the present subject matter.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality of components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a powertrain control system 22, that includes a power plant 24, such as an engine, a motor, or a hybrid engine-motor combination, a transmission system 26 configured to transmit power from the engine to the wheels 14, 16, and/or a brake system 28.

The chassis 12 may also support a cab 30, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface 32, such as a human-machine interface (HMI), for providing messages and/or alerts to the operator and/or for allowing the operator to interface with the vehicle's controller through one or more user-input devices 34 (e.g., levers, pedals, control panels, buttons, and/or the like) within the cab 30 and/or in any other practicable location.

Figure 3:
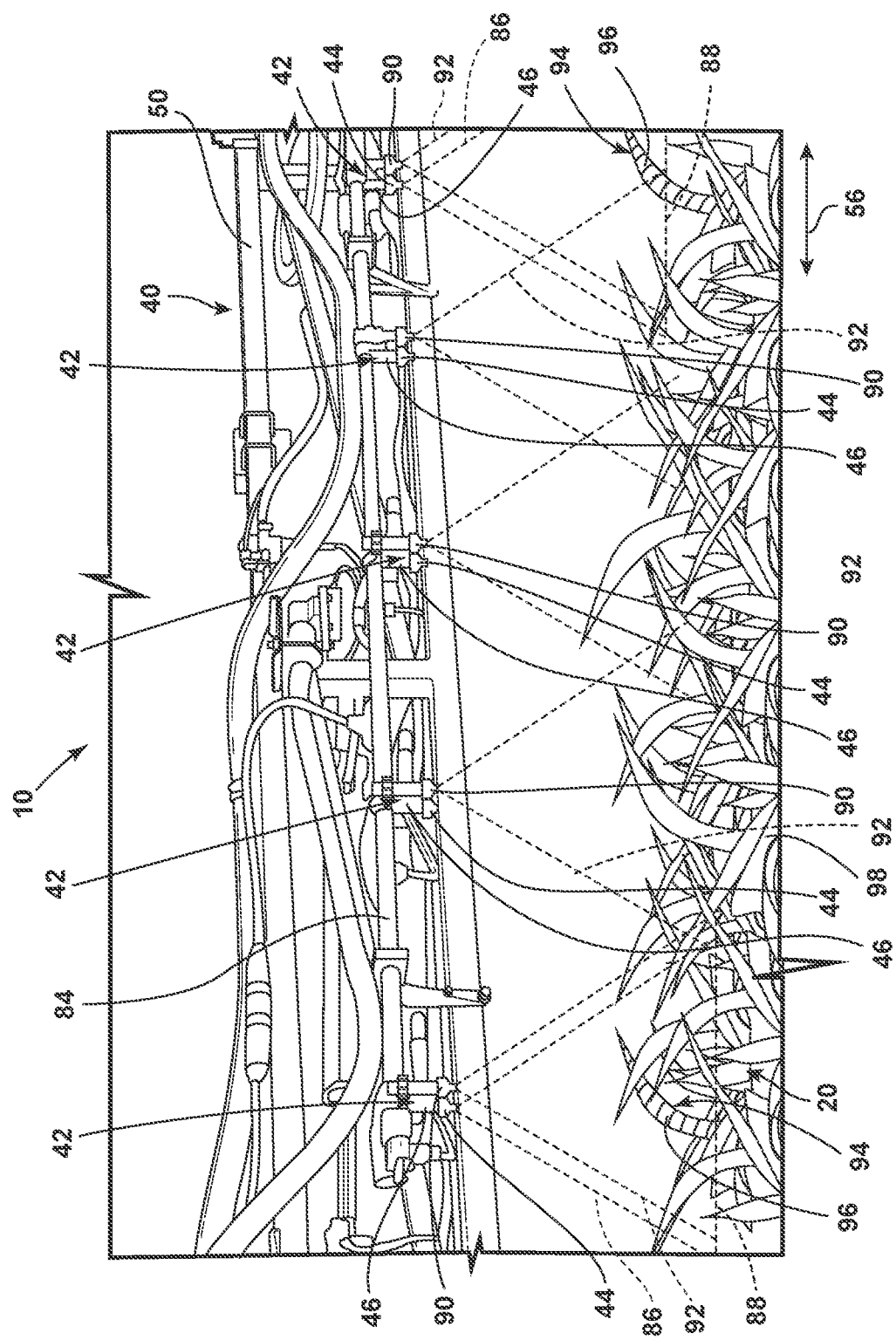
FIG. 3 is a front perspective view of the boom assembly including a plurality of nozzle assemblies positioned there along in accordance with aspects of the present subject matter.

The chassis 12 may also support a product system 41. The product system 41 can include one or more tanks, such as a product tank 36 and/or a rinse tank 38. The product tank 36 is generally configured to store or hold an agricultural product, such as pesticides (e.g., herbicides, insecticides, rodenticides, etc.) and/or nutrients. The agricultural product is conveyed from the product tank 36 and/or the rinse tank 38 through a product circuit including numerous plumbing components, such as interconnected pieces of tubing, for release onto the underlying field 20 (e.g., plants and/or soil) through one or more nozzle assemblies 42 mounted on the boom assembly 40 (or the sprayer 10). Each nozzle assembly 42 may include, for example, a spray nozzle 44 (FIG. 3) and an associated valve 46 (FIG. 3) for regulating the flow rate of the agricultural product through the nozzle 44 (and, thus, the application rate of the nozzle assembly 42), thereby allowing the desired spray characteristics of the output or spray fan of the agricultural product expelled from the nozzle 44 to be achieved. In some instances, each valve 46 may be selectively activated to direct an agricultural product towards a defined target 94 (FIG. 3). For instance, each valve 46 may be selectively activated to deposit a suitable herbicide towards a detected/identified weed 96 (FIG. 3) and/or a nutrient towards a detected/identified crop 98 (FIG. 3).

The chassis 12 may further support a boom assembly 40 that can include a frame 48 that supports first and second boom arms 50, 52, which may be orientated in a cantilevered nature. The first and second boom arms 50, 52 are generally movable between an operative or unfolded position (FIG. 1) and an inoperative or folded position (FIG. 2). When distributing the agricultural product, the first boom arm and/or the second boom arm 50, 52 extends laterally outward from the agricultural sprayer 10 to the operative position in order to cover wide swaths of the underlying ground surface, as illustrated in FIG. 1. When extended, each boom arm 50, 52 defines an extension distance Ed defined between the frame 48 and an outer end portion of the boom arms 50, 52. Further, the boom arms 50, 52, when both unfolded, define a field swath 54 between respective outer nozzle assemblies 420 of the first and second boom arms 50, 52 that is generally commensurate with an area of the field 20 to which the agricultural sprayer 10 covers during a pass across a field 20 to perform the agricultural operation. However, it will be appreciated that in some embodiments, a single boom arm 50, 52 may be utilized during the application operation. In such instances, the field swath 54 may be an area defined between a pair of nozzle assemblies 42 that are furthest from one another in a lateral direction 56.

To facilitate transport, each boom arm 50, 52 of the boom assembly 40 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 50, 52 of the boom assembly 40 may generally include one or more boom sections. For instance, in the illustrated embodiment, the first boom arm 50 includes three boom sections, namely a first inner boom section 58, a first middle boom section 60, and a first outer boom section 62, and the second boom arm 52 includes three boom sections, namely a second inner boom section 64, a second middle boom section 66, and a second outer boom section 68. In such an embodiment, the first and second inner boom sections 58, 64 may be pivotably coupled to the frame 48. Similarly, the first and second middle boom sections 60, 66 may be pivotably coupled to the respective first and second inner boom sections 58, 64, while the first and second outer boom sections 62, 68 may be pivotably coupled to the respective first and second middle boom sections 60, 66. For example, each of the inner boom sections 58, 64 may be pivotably coupled to the frame 48 at pivot joints 70. Similarly, the middle boom sections 60, 66 may be pivotably coupled to the respective inner boom sections 58, 64 at pivot joints 72, while the outer boom sections 62, 68 may be pivotably coupled to the respective middle boom sections 60, 66 at pivot joints 74.

As is generally understood, pivot joints 70, 72, 74 may be configured to allow relative pivotal motion between the adjacent boom sections of each boom arm 50, 52. For example, the pivot joints 70, 72, 74 may allow for articulation of the various boom sections between a fully extended or working position (e.g., as shown in FIG. 1), in which the boom sections are unfolded along the lateral direction 56 of the boom assembly 40 to allow for the performance of an agricultural spraying operation, and a transport position (FIG. 2), in which the boom sections are folded inwardly to reduce the overall width of the boom assembly 40 along the lateral direction 56. It will be that, although each boom arm 50, 52 is shown in FIG. 1 as including three individual boom sections coupled along opposed sides of the central boom section, each boom arm 50, 52 may generally have any suitable number of boom sections.

Additionally, as shown in FIG. 1, the boom assembly 40 may include inner fold actuators 76 coupled between the inner boom sections 58, 64 and the frame 48 to enable pivoting or folding between the fully-extended working position and the transport position. For example, by retracting/extending the inner fold actuators 76, the inner boom sections 58, 64 may be pivoted or folded relative to the frame 48 about a pivot axis 70A defined by the pivot joints 70. Moreover, the boom assembly 40 may also include middle fold actuators 78 coupled between each inner boom section 58, 64 and its adjacent middle boom section 60, 66 and outer fold actuators 80 coupled between each middle boom section 60, 66 and its adjacent outer boom section 62, 68. As such, by retracting/extending the middle and outer fold actuators 78, 80, each middle and outer boom section 60, 66, 62, 68 may be pivoted or folded relative to its respective inwardly adjacent boom section 58, 64, 60, 66 about a respective pivot axis 72A, 74A. When moving to the transport position, the boom assembly 40 and fold actuators 76, 78, 80 are typically oriented such that the pivot axes 70A, 72A, 74A are generally parallel to the vertical direction and, thus, the various boom sections 58, 64, 60, 66, 62, 68 of the boom assembly 40 are configured to be folded horizontally (e.g., parallel to the lateral direction 56) about the pivot axes 70A, 72A, 74A to keep the folding height of the boom assembly 40 as low as possible for transport. However, the pivot axes 70A, 72A, 74A may be oriented along any other suitable direction.

Referring now to FIG. 3, a front perspective view of the boom assembly 40 including a plurality of nozzle assemblies 42 positioned there along is illustrated in accordance with aspects of the present subject matter. In some embodiments, each nozzle assembly 42 may be configured to dispense the agricultural product stored within the product tank 36 (FIG. 1) and/or the rinse tank 38 (FIG. 1) onto a target 94. In several embodiments, the nozzle assemblies 42 may be mounted on and/or coupled to the first and/or second boom arms 50, 52 of the boom assembly 40, with the nozzle assemblies 42 being spaced apart from each other along the lateral direction 56. Furthermore, fluid conduits 84 may fluidly couple the nozzle assemblies 42 to the tank 36 and/or the rinse tank 38. In this respect, as the sprayer 10 travels across the field 20 in the direction of forward travel 18 (FIG. 1) to perform a spraying operation, the agricultural product moves from the product tank 36 through the fluid conduits to each of the nozzle assemblies 42. The nozzles 44 may, in turn, dispense or otherwise spray a fan 86 of the agricultural product onto the target 94 when the target 94 is in an application region 88 that corresponds to an area for which the agricultural product deposited from the nozzle 44 may contact. In various instances, the application region 88 may be varied based on various factors, which can include, but are not limited to, sprayer conditions (e.g., speed of the sprayer 10, the direction of forward travel 18 of the sprayer 10, acceleration of the sprayer 10, etc.), boom conditions (e.g., speed of the nozzle assembly 42, deflection magnitude of the assembly 42 from a default position, acceleration of the nozzle assembly 42, direction of movement of the nozzle assembly 42 relative to the frame 48 and/or the underlying field 20, etc.), environmental conditions (e.g., wind speed, wind direction, percent humidity, ambient temperature, etc.), and/or any other conditions.

In some embodiments, the nozzle assembly 42 may include one or more nozzles 44 having varied spray characteristics. As such, the nozzle assembly 42 may vary the application region 88 based on the selected nozzle 44. In various examples, the nozzles 44 within each nozzle assembly 42 may correspond to flat fan nozzles configured to dispense a flat fan of the agricultural product. However, in alternative embodiments, the nozzles 44 may correspond to any other suitable types of nozzles, such as dual pattern nozzles and/or hollow cone nozzles.

As shown, the boom assembly 40 may further include one or more target sensors 90 configured to capture data indicative of field conditions within the field 20. In several embodiments, the target sensors 90 may be installed or otherwise positioned on the boom assembly 40. As such, each target sensor 90 may have a field of view or detection zone 92 (e.g., as indicated by dashed lines in FIG. 3). In this regard, each target sensor 90 may be able to capture data indicative of objects and/or field conditions within its detection zone 92. For instance, in some embodiments, the target sensors 90 are object detecting/identifying imaging devices, where the data captured by the target sensors 90 may be indicative of the location and/or type of plants and/or other objects within the field 20. More particularly, in some embodiments, the data captured by the target sensors 90 may be used to allow various objects to be detected. For example, the data captured may allow a computing system 204 to distinguish weeds 96 from useful plants within the field 20 (e.g., crops 98). In such instances, the target sensor data may, for instance, be used within a spraying operation to selectively spray or treat a defined target 94, which may include the detected/identified weeds 96 (e.g., with a suitable herbicide) and/or the detected/identified crops 98 (e.g., with a nutrient).

It will be that the agricultural sprayer 10 may include any suitable number of target sensors 90 and should not be construed as being limited to the number of target sensors 90 shown in FIG. 3. Additionally, it will be that the target sensors 90 may generally correspond to any suitable sensing devices. For example, each target sensor 90 may correspond to any suitable cameras, such as single-spectrum camera or a multi-spectrum camera configured to capture images, for example, in the visible light range and/or infrared spectral range. Additionally, in various embodiments, the cameras may correspond to a single lens camera configured to capture two-dimensional images or a stereo camera having two or more lenses with a separate image target sensor 90 for each lens to allow the cameras to capture stereographic or three-dimensional images. Additionally or alternatively, the target sensors 90 may correspond to any other suitable image capture devices and/or other imaging devices capable of capturing "images" or other image-like data of the field 20. For example, the target sensors 90 may correspond to or include radio detection and ranging (RADAR) sensors, light detection and ranging (LIDAR) sensors, and/or any other practicable device.

Figure 4:
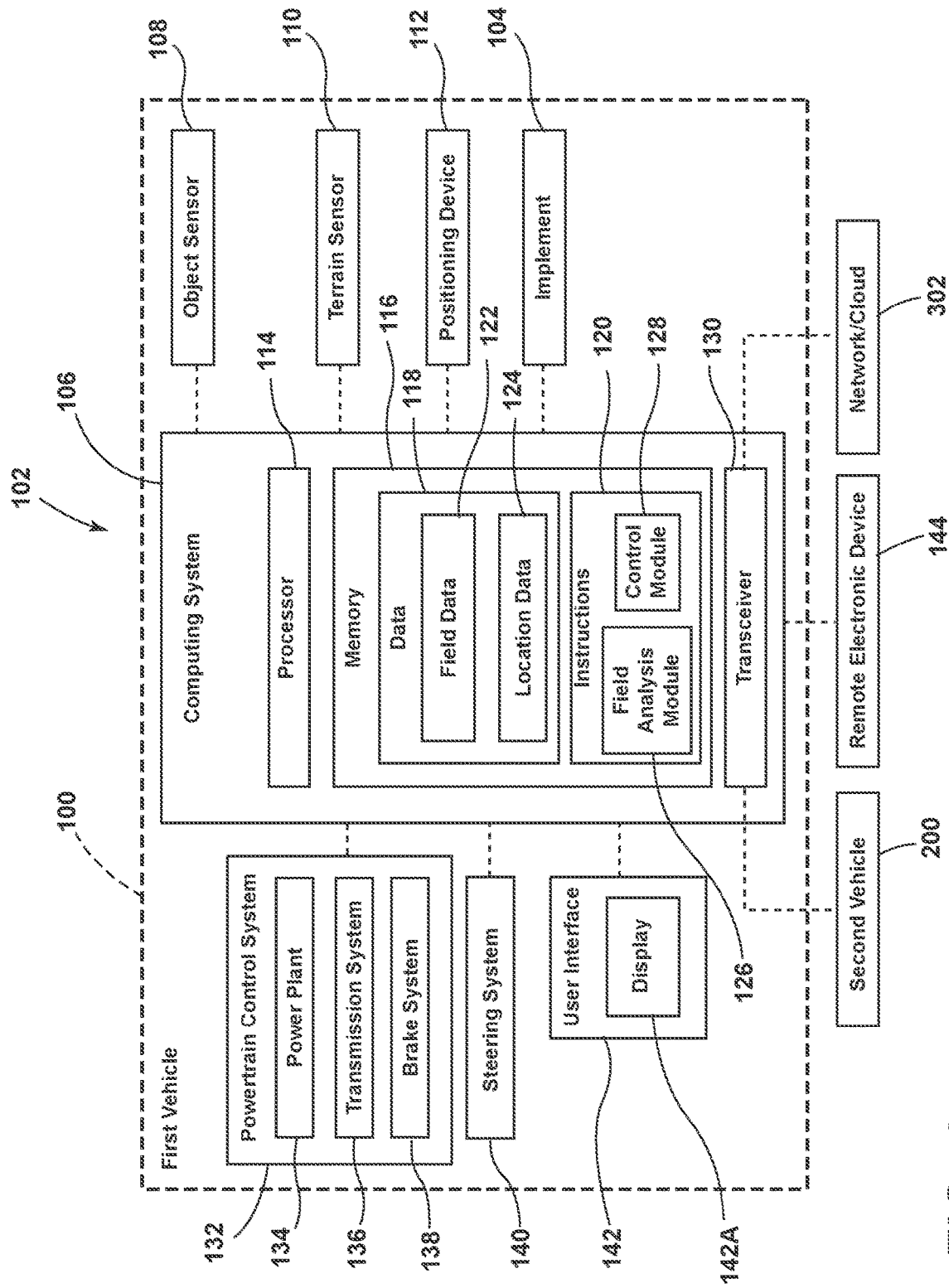
FIG. 4 illustrates a block diagram of components of a system of a first agricultural vehicle in accordance with aspects of the present subject matter.
Figure 5:
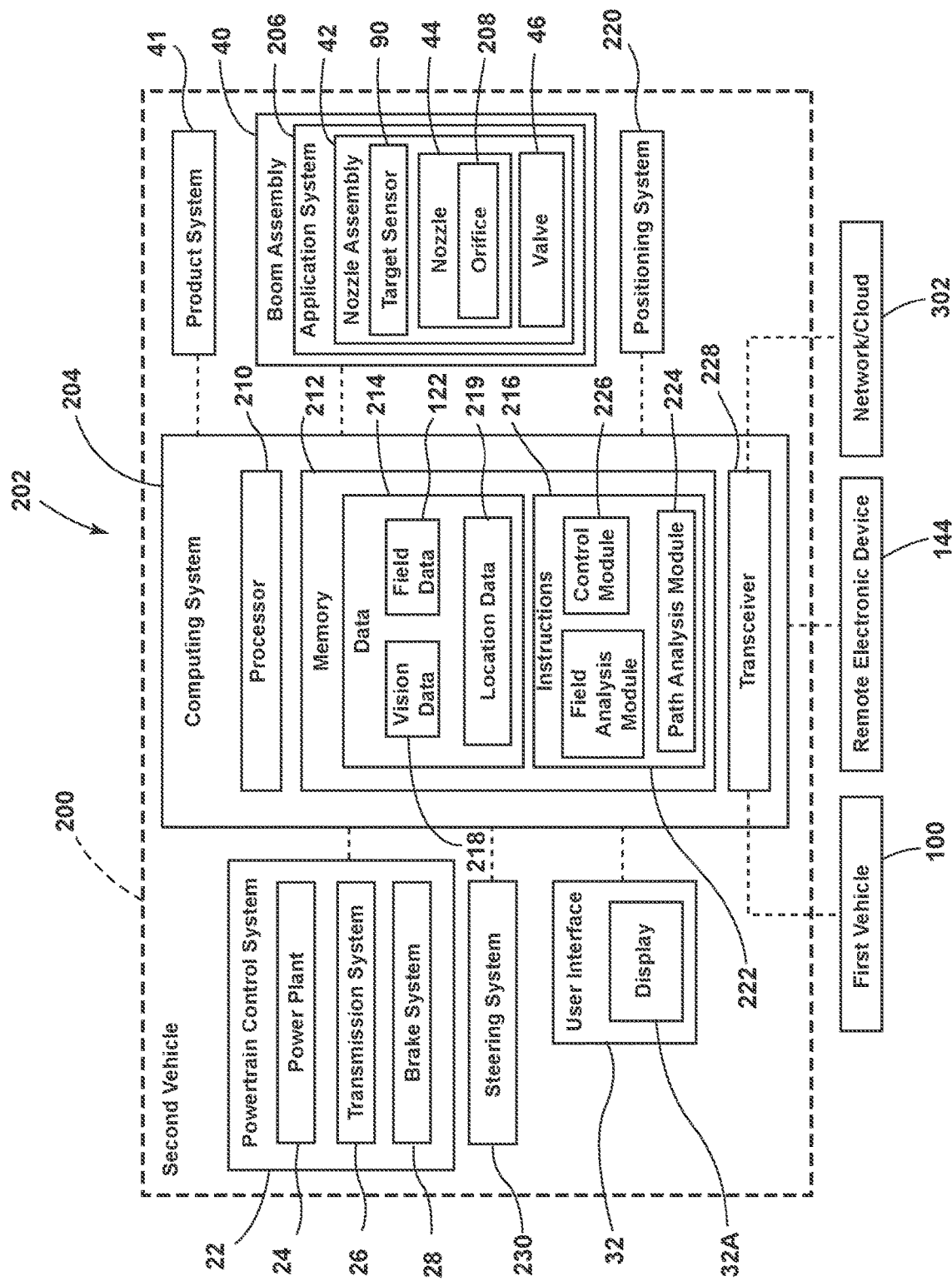
FIG. 5 illustrates a block diagram of components of a system of a second agricultural vehicle for selectively applying an agricultural product in accordance with aspects of the present subject matter.
Figure 6:
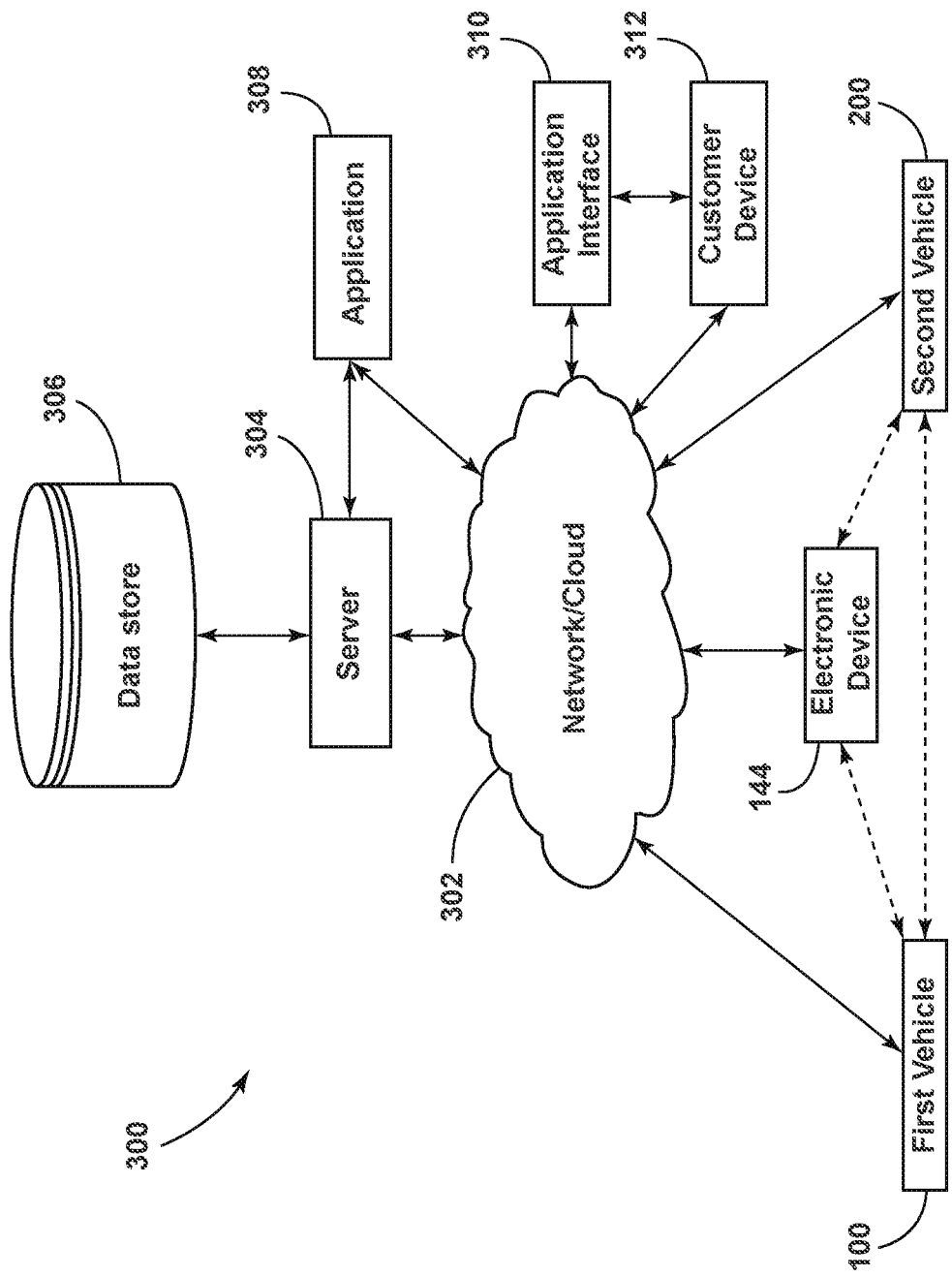
FIG. 6 is a block diagram illustrating the first vehicle and the second vehicle operably coupled with a remote server in accordance with aspects of the present subject matter.

Referring now to FIGS. 4-6, in some instances, various targets 94 within the field 20 may have various agricultural products applied thereto. For example, a first set 416 (FIG. 7) of weeds 96 may have a first agricultural product applied thereto and a second set 418 (FIG. 7) of weeds 96 may have a second agricultural product applied thereto. In some examples, a first work vehicle may be used to detect the one or more targets 94 within the field 20 during a first operation and, subsequently, a second vehicle 200 may apply the respective agricultural product to each target 94 during a second operation. In various embodiments, the sprayer 10 may include more than one product tank 36. In such instances, the sprayer 10 may be configured to selectively dispense the first agricultural product at the first set 416 of weeds 96 and the second agricultural product at the second set 418 of weeds 96.

Referring further to FIG. 4, a schematic view of a system 102 for operating the first vehicle 100 having an agricultural implement 104 is illustrated in accordance with aspects of the present subject matter. In general, the system 102 will be described with reference to an agricultural vehicle configured to perform an agricultural operation. However, it will be by those of ordinary skill in the art that the disclosed system 102 may generally be utilized with agricultural machines having any other suitable machine configuration. For purposes of illustration, communicative links, or electrical couplings of the system 102 shown in FIG. 4 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several embodiments, the system 102 may include a first computing system 106 and various other components configured to be communicatively coupled to and/or controlled by the first computing system 106, such as an object sensor 108 configured to detect field conditions of a swath 54 within a field 20 (FIG. 1), a terrain sensor 110, and a positioning device 112.

In general, the first computing system 106 may comprise any suitable processor-based device, such as a computing device or any suitable combination of computing devices. Thus, in several embodiments, the first computing system 106 may include one or more processors 114 and associated memory 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 116 of the first computing system 106 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 116 may generally be configured to store information accessible to the processor 114, including data 118 that can be retrieved, manipulated, created, and/or stored by the processor 114 and instructions 120 that can be executed by the processor 114, when implemented by the processor 114, configure the first computing system 106 to perform various computer-implemented functions, such as one or more aspects of the image processing algorithms and/or related methods described herein. In addition, the first computing system 106 may also include various other suitable components, such as a communications circuit or module, one or more input/output channels, a data/control bus, and/or the like.

It will be appreciated that, in several embodiments, the first computing system 106 may correspond to an existing controller of the first vehicle 100, or the first computing system 106 may correspond to a separate processing device. For instance, in some embodiments, the first computing system 106 may form all or part of a separate plug-in module or computing device that is installed relative to the first vehicle 100 or the implement 104 to allow for the disclosed system 102 and method to be implemented without requiring additional software to be uploaded onto existing control devices of the first vehicle 100 or the implement 104.

In several embodiments, the data 118 may be information received and/or generated by the first computing system 106 that is stored in one or more databases. For instance, as shown in FIG. 4, the memory 116 may include a field database 122 for storing field data received from the object sensor 108 and/or the terrain sensor 110. For instance, the object sensor 108 may be configured to continuously, periodically, or otherwise capture data associated with various objects within the field 20. In such embodiments, the data transmitted to the computing system 204 from the object sensor 108 may be stored within the field database 122 for subsequent processing and/or analysis. In addition, the terrain sensor 110 may be configured to capture data indicative of the terrain of the field 20. In such embodiments, the data transmitted to the computing system 204 from the one or more terrain sensors 110 may also be stored within the field database 122 for subsequent processing and/or analysis.

Additionally or alternatively, as shown in FIG. 4, the memory 116 may also include a location database 124, which may be configured to store data from the positioning device 112 that is received in conjunction with the data from the object sensor 108 and stored in association with such data for later use in geo-locating objects within the field 20. The location database 124 may also be configured to store data from the positioning device 112 that is received in conjunction with the data from the terrain sensor 110 and stored in association with such data for later use in geo-locating objects within the field 20.

In several embodiments, the instructions 120 stored within the memory 116 of the first computing system 106 may be executed by the processor 114 to implement a field analysis module 126. In general, the field analysis module 126 map be configured to assess the field data and associated location data and geo-locate detected objects within the field 20. In some embodiments, the objects may include the presence of weeds 96 (FIG. 3) or other conditions within the field 20. As such, in various embodiments, as the first vehicle 100 travels across the field 20, the first computing system 106 may be configured to receive sensor data (e.g., image data) associated with objects within the field 20 from the object sensor 108 (e.g., plant-identifying sensors) and the terrain sensor 110.

Thereafter, the first computing system 106 may be configured to analyze/process the data to detect/identify the type and location of various objects in the field 20. In this regard, the first computing system 106 may include any suitable image processing algorithms stored within its memory 116 or may otherwise use any suitable image processing techniques to determine, for example, the presence and locations of objects within the field 20 based on the received sensor data. For instance, in some embodiments, the first computing system 106 may be able to distinguish between weeds 96 and emerging/standing crops 98 (FIG. 3). Additionally or alternatively, in some embodiments, the first computing system 106 may be configured to distinguish between weeds 96 and emerging/standing crops 98, such as by identifying crop rows of emerging/standing crops 98 and then inferring that plants positioned between adjacent crop rows are weeds 96.

The instructions 120 stored within the memory 116 of the first computing system 106 may further be executed by the processor 114 to implement a control module 128. The control module 128 may generally be configured to perform a control action during the first operation. For example, in some embodiments, the first vehicle 100 may include an implement 104 that is configured to perform at least one of a planting process, seeding process, a tilling process, or a harvesting process during operation of the first vehicle 100.

With further reference to FIG. 4, in various embodiments, the object sensor 108 may be configured as one or more imaging devices. In several embodiments, the one or more imaging devices may correspond to a camera for capturing two-dimensional and/or three-dimensional images of the field 20. In several embodiments, the first computing system 106 may be configured to receive and process data captured by the object sensor 108 to allow one or more objects within imaged portions of the field 20 to be identified. For instance, the first computing system 106 may be configured to execute one or more suitable image processing algorithms for identifying one or more targets 94 within the data provided to the first computing system 106. In various examples, the object sensor 108 may be mounted to a front portion of the first vehicle 100. In such instances, the object sensor 108 may be configured to capture forward-looking and/or lateral-looking images of the field 20. Additionally, or alternatively, in several examples, the object sensor 108 may be mounted to a rear portion of the first vehicle 100. In such instances, the object sensor 108 may be configured to capture rearward-looking and/or lateral-looking images of the field 20. Additionally, or alternatively, in several examples, the object sensor 108 may be mounted to one or more side portions of the first vehicle 100. In such instances, the object sensor 108 may be configured to capture forward-looking, rearward-looking, and/or lateral-looking images of the field 20.

The terrain sensor 110 may be any type of sensor that is configured to detect at least one of a soil compaction level, a soil percent moisture, a field residue levels/amounts, a field traffic, a soil type, a soil composition, a topsoil depth, a subsoil depth, a field elevation, a tire traction, and/or any other suitable terrain condition that may affect a type of weed 96 that may be present within the field 20.

In some embodiments, the positioning device 112 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the first vehicle 100.

Further, as shown in FIG. 4, the first computing system 106 may also include a transceiver 130 to allow for the first computing system 106 to communicate with any of the various other system components described herein. For instance, one or more communicative links or interfaces (e.g., one or more data buses) may be provided between the transceiver 130 and the object sensor 108, the terrain sensor 110, the positioning device 112, and/or the implement 104.

Similarly, one or more communicative links or interfaces may be provided between the transceiver 130 and a powertrain control system 132 of the first vehicle 100 which can include a power plant 134, a transmission system 136, and a brake system 138. The power plant 134 is configured to vary the output of the engine to control the speed of the first vehicle 100. For example, the power plant 134 may vary a throttle setting of the engine, a fuel/air mixture of the engine, a timing of the engine, and/or other suitable engine parameters to control engine output. In addition, the transmission system 136 may adjust gear selection to control the speed of the first vehicle 100. Furthermore, the brake system 138 may adjust braking force, thereby controlling the speed of the first vehicle 100. While the illustrated powertrain control system 132 includes the power plant 134, the transmission system 136, and the brake system 138, it will be that alternative embodiments may include one or two of these systems, in any suitable combination. Further embodiments may include a powertrain control system 132 having other and/or additional systems to facilitate adjusting the speed of the first vehicle 100.

Additionally or alternatively, one or more communicative links or interfaces (e.g., one or more data buses) may be provided between the transceiver 130 and a steering system 140 configured to control a direction of the first vehicle 100 through manipulation of one or more wheels (or tracks). In some instances, the steering system 140 may be an electric power-assisted steering (EPAS) system that includes an electric steering motor for turning the steered wheels to a steering angle based on a steering command generated by the first computing system 106. The steering command may be provided for autonomously steering the first vehicle 100 and may alternatively be provided manually via a rotational position (e.g., a steering wheel angle) of a steering device (e.g., a steering wheel, a rotatable knob, and/or any other device).

Further, one or more communicative links or interfaces may be provided between the transceiver 130 and a user interface 142, which may be housed within a cab of the first vehicle 100 or at any other suitable location. The user interface 142 may be configured to provide feedback to the operator of the first vehicle 100. The user interface 142 may include one or more feedback devices, such as display screens 142A, speakers, warning lights, and/or the like, which are configured to communicate such feedback. In addition, some embodiments of the user interface 142 may include one or more input devices, such as touchscreens, keypads, touchpads, knobs, buttons, sliders, switches, mice, microphones, and/or the like, which are configured to receive user inputs from the operator.

Still further, one or more communicative links or interfaces may be provided between the transceiver 130 and the second vehicle 200 and/or a remote electronic device 144. The electronic device 144 may also include a display for displaying information to a user. For instance, the electronic device 144 may display one or more user interfaces and may be capable of receiving remote user inputs. In addition, the electronic device 144 may provide feedback information, such as visual, audible, and tactile alerts, and/or allow the operator to alter or adjust one or more components of the first vehicle 100 and/or the implement 104 through the usage of the remote electronic device 144. It will be appreciated that the electronic device 144 may be any one of a variety of computing devices and may include a processor and memory. For example, the electronic device 144 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In operation, as the first vehicle 100 traverses the field 20 to perform a first operation, an object sensor 108 and a terrain sensor 110 may monitor the field 20. Data captured by each respective sensor may be provided to the first computing system 106. Additionally, a positioning device 112 may be configured to provide data to the computing system such that the first vehicle 100 and/or the objects. In turn, the computing system may store that field data and location data. In some embodiments, the field data and the location data may be utilized by the first computing system 106 to identify and/or map various features of the field 20. In addition to mapping the various features, the first computing system 106 may sort the objects into one or sets. For instance, various weeds 96 may be identified by the first computing system 106 and sorted based on type into the one or more sets. The weeds 96 may be sorted based on various imaging process techniques and/or based on the terrain conditions of the area upon which the weed 96 was detected.

In addition, the data may be provided to a network/cloud 302, the second vehicle 200, and/or the electronic device 144. The second vehicle 200 in turn may utilize the data provided by the first vehicle 100 to perform a second operation, such as applying one or more agricultural products to the objects identified from the data provided by the first vehicle 100.

Referring to FIG. 5, a schematic view of a system 202 for operating the second vehicle 200 is illustrated in accordance with aspects of the present subject matter. In general, the system 202 will be described with reference to the sprayer 10 described above with reference to FIGS. 1-3. However, it will be by those of ordinary skill in the art that the disclosed system 202 may generally be utilized with agricultural machines having any other suitable machine configuration. As discussed above, for purposes of illustration, communicative links, or electrical couplings of the system 202 shown in FIG. 5 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In the embodiment illustrated in FIG. 5, the second vehicle 200 may include a computing system operably coupled with an agricultural product application system 206. The application system 206 may be configured to dispense an agricultural product from the product system 41 to the field 20 through one or more nozzle assemblies 42 that is positioned at least partially along the boom assembly 40. It will be appreciated that the application system 206 can include any number of nozzle assemblies 42 without departing from the scope of the present disclosure.

In some embodiments, each nozzle assembly 42 can include a valve 46 operably coupled with a nozzle 44 and configured to control a flow of agricultural product through the nozzle 44. The nozzles 44 defines an orifice 208 that may dispense a fan 86 (FIG. 3) of the agricultural product. In some instances, the second computing system 204 may be configured to detect the various objects within the field 20 (e.g., weeds 96 (FIG. 3) from useful plants), which may also be identified during the first operation. In such instances, the application system 206 may perform a spraying operation to selectively spray or treat the defined targets 94 from select nozzles based on the target 94 being positioned within an application region 88 of the nozzle 44. The valve 46 can further include restrictive orifices, regulators, and/or the like to regulate the flow of agricultural product from the product tank 36 (FIG. 1) and/or the rinse tank 38 (FIG. 2) to the orifice 208. In various embodiments, the valve 46 may be configured as electronically controlled valves that are controlled by a Pulse Width Modulation (PWM) signal for altering the application rate of the agricultural product.

In addition, one or more target sensors 90 may be associated with each respective nozzle 44 and configured to capture images of a portion of the field 20 (FIG. 1). In various embodiments, each target sensor 90 may have a detection zone 92 (FIG. 3) that at least partially overlaps with an application region 88 (FIG. 3) of a nozzle 44 such that the target sensor 90 can provide data related to an object being positioned externally and/or internally of the application region 88 of the fan 86. As discussed above, in several embodiments, the one or more target sensors 90 may correspond to a camera for capturing two-dimensional and/or three-dimensional images of the field 20. In several embodiments, the second computing system 204 may be configured to receive and process data captured by the target sensors 90 to allow one or more objects within imaged portions of the field 20 to be determined. For instance, the second computing system 204 may receive information from the first operation process, which may include a location of one or more targets 94, a weed map 430 (FIG. 10), a prescription map 432 (FIG. 11), and/or any other information. In turn, the second vehicle 200 may be configured to execute one or more suitable image processing algorithms for identifying the one or more targets 94 within the weed map 430 and/or the prescription map 432 within the data provided to the second computing system 204. Based on the detection of a target 94, the computing system 204 may utilize one or more nozzle assemblies 42 to selectively spray the target 94.

In general, the second computing system 204 may comprise any suitable processor-based device, such as a computing device or any suitable combination of computing devices. Thus, in several embodiments, the second computing system 204 may include one or more processors 210 and associated memory 212 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 212 of the second computing system 204 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 212 may generally be configured to store information accessible to the processor 210, including data 214 that can be retrieved, manipulated, created, and/or stored by the processor 210 and instructions 216 that can be executed by the processor 210, when implemented by the processor 210, configure the second computing system 204 to perform various computer-implemented functions. In addition, the second computing system 204 may also include various other suitable components, such as a communications circuit or module, one or more input/output channels, a data/control bus, and/or the like.

It will be appreciated that, in several embodiments, the second computing system 204 may correspond to an existing controller of the agricultural second vehicle 200, or the second computing system 204 may correspond to a separate processing device. For instance, in some embodiments, the second computing system 204 may form all or part of a separate plug-in module or computing device that is installed relative to the second vehicle 200 or boom assembly 40 to allow for the disclosed system 202 and method to be implemented without requiring additional software to be uploaded onto existing control devices of the second vehicle 200 or the boom assembly 40.

In several embodiments, the data 214 may be information received and/or generated by the first vehicle 100 and/or the second computing system 204 that is stored in one or more databases. For instance, as shown in FIG. 5, the memory may include the field data generated by the first vehicle 100 and/or any processed data that may be generated from the field data generated by the first vehicle 100.

The memory 212 may also include a vision database 218 for storing vision-based data received from the target sensors 90. For example, the target sensors 90 may be configured to continuously or periodically capture images of the field 20 or other image-like data associated with the field 20. In such embodiments, the data transmitted to the second computing system 204 from the target sensors 90 may be stored within the vision database 218 for subsequent processing and/or analysis. It will be that, as used herein, the terms vision-based data or image-like data may include any suitable type of data received from the target sensors 90 that allow for the objects and/or field conditions of a field 20 to be analyzed, including photographs or other images, RADAR data, LIDAR data, and/or other image-related data (e.g., scan data and/or the like).

The memory may also include location database 219, which may be configured to store data from a positioning system 220 associated with the second vehicle 200. In some embodiments, the positioning system 220 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the first vehicle 100.

In several embodiments, the instructions 216 stored within the memory 212 of the second computing system 204 may be executed by the processor 210 to implement an image analysis module 222. In general, the image analysis module 222 may be configured to process/analyze the images received from the target sensors 90, and/or the data deriving therefrom to estimate or determine the location of one more weeds 96 based on the field data provided by the first vehicle 100 and/or based on data captured by the target sensors 90. Specifically, in several embodiments, the image analysis module 222 may be configured to execute one or more image processing algorithms to determine a position of the target 94. For example, in some embodiments, the image analysis module 222 may receive one or more imaged portions of the field 20 from the target sensors 90 and correlate the captured portions of the field 20 with the field data to locate a previously identified object.

In various embodiments, the instructions 216 stored within the memory 212 of the second computing system 204 may be executed by the processor 210 to implement a path analysis module 224. In general, the path analysis module 224 may be configured to process/analyze the sprayer path 242 to estimate or determine a position of the second vehicle 200. For example, in some embodiments, the path analysis module 224 may receive data from the image analysis module 222 and/or the positioning system 220. In turn, the instructions may ensure that the second vehicle 200 is being operated within a defined region and/or with a specific agricultural product based on the region within which the second vehicle 200 is operating.

Referring still to FIG. 5, in some embodiments, the instructions 216 stored within the memory 212 of the second computing system 204 may also be executed by the processor 210 to implement a control module 226. In general, the control module 226 may be configured to electronically control the operation of one or more components of the agricultural second vehicle 200. For instance, the second vehicle 200 may be configured to selectively spray various targets 94 when the target 94 is identified and within a defined bin and/or within a defined location. For example, when the target 94 is defined within a first set 416 of weeds 96, a first agricultural product may be applied thereto. Additionally or alternatively, any target 94 identified within a first region 434 (FIG. 11) may have the first agricultural product applied thereto. Conversely, when the target 94 is defined within a second set 418 of weeds 96, a second agricultural product may be applied thereto. Additionally or alternatively, any target 94 identified within a second region 434 (FIG. 11) may have the second agricultural product applied thereto.

Further, as shown in FIG. 5, the second computing system 204 may also include a transceiver 228 to allow for the second computing system 204 to communicate with any of the various other system components described herein. For instance, one or more communicative links or interfaces (e.g., one or more data buses) may be provided between the transceiver 228 and the application system 206. In such instances, the images or other vision-based data captured by the target sensors 90 may be transmitted from the target sensors 90 to the second computing system 204. In addition, the second computing system 204 may provide instructions to activate/deactivate each valve 46 at various times to selectively spray or treat the target 94.

Similarly, one or more communicative links or interfaces may be provided between the transceiver 228 and the powertrain control system 22 that includes the power plant 24, the transmission system 26, and the brake system 28. Through the usage of any of these systems, the second computing system 204 may determine an upcoming activation time with the upcoming activation time defining a time in which a detected target 94 is to be positioned within an application region 88.

The power plant 24 is configured to vary the output of the engine to control the speed of the second vehicle 200. For example, the power plant 24 may vary a throttle setting of the engine, a fuel/air mixture of the engine, a timing of the engine, and/or other suitable engine parameters to control engine output. In addition, the transmission system 26 may adjust gear selection within a transmission system 26 to control the speed of the second vehicle 200. Furthermore, the brake system 28 may adjust braking force, thereby controlling the speed of the second vehicle 200. While the illustrated powertrain control system 22 includes the power plant 24, the transmission system 26, and the brake system 28, it will be that alternative embodiments may include one or two of these systems, in any suitable combination. Further embodiments may include a powertrain control system 22 having other and/or additional systems to facilitate adjusting the speed of the second vehicle 200.

Additionally or alternatively, one or more communicative links or interfaces (e.g., one or more data buses) may be provided between the transceiver 228 and the steering system 230 configured to control a direction of the second vehicle 200 through manipulation of one or more wheels 14, 16 (FIG. 2) (or tracks). In some instances, the steering system 230 may be an electric power-assisted steering (EPAS) system.

Further, one or more communicative links or interfaces may be provided between the transceiver 228 and a user interface, such as a user interface 32 housed within the cab 30 of the second vehicle 200 or at any other suitable location. The user interface 32 may be configured to provide feedback to the operator of the agricultural second vehicle 200. Thus, the user interface 32 may include one or more feedback devices, such as display screens 32A, speakers, warning lights, and/or the like, which are configured to communicate such feedback. In addition, some embodiments of the user interface 32 may include one or more input devices 34 (FIG. 1), such as touchscreens, keypads, touchpads, knobs, buttons, sliders, switches, mice, microphones, and/or the like, which are configured to receive user inputs from the operator.

One or more communicative links or interfaces may be provided between the transceiver 228 and the first vehicle 100, a remote electronic device 144, and/or a network/cloud 302.

It will be appreciated that, although the various control functions and/or actions will generally be described herein as being executed by the second computing system 204, one or more of such control functions/actions (or portions thereof) may be executed by a separate second computing system 204 or may be distributed across two or more computing systems (including, for example, the second computing system 204 and a separate computing system). For instance, in some embodiments, the second computing system 204 may be configured to acquire data from the target sensors 90 for subsequent processing and/or analysis by a separate computing system (e.g., a computing system associated with a remote server). In other embodiments, the second computing system 204 may be configured to execute the image analysis module 222 to determine and/or monitor one or more objects and/or field conditions within the field 20, while a separate computing system (e.g., a second vehicle computing system 204 associated with the agricultural second vehicle 200) may be configured to execute the control module 226 to control the operation of the agricultural second vehicle 200 based on data and/or instructions transmitted from the second computing system 204 that is associated with the monitored objects and/or field conditions.

Referring to FIG. 6, in some examples, a system 300 may include the first vehicle 100, the second vehicle 200, and/or the electronic device 144, any of which may be communicatively coupled with one another and/or one or more remote sites, such as a remote server 304 via a network/cloud 302 to provide data and/or other information therebetween. The network/cloud 302 represents one or more systems by which the first vehicle 100, the second vehicle 200, and/or the electronic device 144 may communicate with the remote server 304. The network/cloud 302 may be one or more of various wired or wireless communication mechanisms, including any desired combination of wired and/or wireless communication mechanisms and any desired network topology (or topologies when multiple communication mechanisms are utilized). Exemplary communication networks 62 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 302 in FIG. 6). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 302.

The server 304 may be one or more computer servers, each of which may include at least one processor and at least one memory, the memory storing instructions executable by the processor, including instructions for carrying out various steps and processes. The server 304 may include or be communicatively coupled to a data store 306 for storing collected data as well as instructions for the first vehicle 100, the second vehicle 200, and/or the electronic device 144 with or without intervention from a user, the first vehicle 100, the second vehicle 200, and/or the electronic device 144. Moreover, the server 304 may be capable of analyzing initial or raw sensor data received from the first vehicle 100, the second vehicle 200, and final or post-processing data (as well as any intermediate data created during data processing). Accordingly, the instructions provided to any one or more of the first vehicle 100, the second vehicle 200, and/or the electronic device 144 may be determined and generated by the server 304 and/or one or more cloud-based applications 308. In such instances, the user interface 250 of the first vehicle 100, the second vehicle 200, and/or the electronic device 144 may be a dummy device that provides various notifications based on instructions from the network/cloud 302.

With further reference to FIG. 6, the server 304 also generally implements features that may enable the first vehicle 100, the second vehicle 200, and/or the electronic device 144 to communicate with cloud-based applications 308. Communications from the electronic device 144 can be directed through the network/cloud 302 to the server 304 and/or cloud-based applications 308 with or without a networking device, such as a router and/or modem. Additionally, communications from the cloud-based applications 308, even though these communications may indicate one the first vehicle 100, the second vehicle 200, and/or the electronic device 144 as an intended recipient, can also be directed to the server 304. The cloud-based applications 308 are generally any appropriate services or applications 308 that are accessible through any part of the network/cloud 302 and may be capable of interacting with the electronic device 144.

In various examples, the first vehicle 100, the second vehicle 200, and/or the electronic device 144 can be feature-rich with respect to communication capabilities, i.e. have built-in capabilities to access the network/cloud 302 and any of the cloud-based applications 308 or can be loaded with, or programmed to have, such capabilities. The first vehicle 100, the second vehicle 200, and/or the electronic device 144 can also access any part of the network/cloud 302 through industry-standard wired or wireless access points, cell phone cells, or network nodes. In some examples, users can register to use the remote server 304 through the first vehicle 100, the second vehicle 200, and/or the electronic device 144, which may provide access to the first vehicle 100, the second vehicle 200, and/or the electronic device 144 and/or thereby allow the server 304 to communicate directly or indirectly with the first vehicle 100, the second vehicle 200, and/or the electronic device 144. In various instances, the first vehicle 100, the second vehicle 200, and/or the electronic device 144 may also communicate directly, or indirectly, with the first vehicle 100, the second vehicle 200, and/or the electronic device 144 or one of the cloud-based applications 308 in addition to communicating with or through the server 304. According to some examples, the first vehicle 100, the second vehicle 200, and/or the electronic device 144 can be preconfigured at the time of manufacture with a communication address (e.g. a URL, an IP address, etc.) for communicating with the server 304 and may or may not have the ability to upgrade or change or add to the preconfigured communication address.

Referring still to FIG. 6, when a new cloud-based application 308 is developed and introduced, the server 304 can be upgraded to be able to receive communications for the new cloud-based application 308 and to translate communications between the new protocol and the protocol used by the first vehicle 100, the second vehicle 200, and/or the electronic device 144. The flexibility, scalability, and upgradeability of current server technology render the task of adding new cloud-based application protocols to the server 304 relatively quick and easy.

In several embodiments, an application interface 310 may be operably coupled with the cloud 302 and/or the application 308. The application interface 310 may be configured to receive data related to the first vehicle 100, the second vehicle 200, and/or the electronic device 144. In various embodiments, one or more inputs related to the field data may be provided to the application interface 310. For example, a farmer, a vehicle user, a company, or other persons may access the application interface 310 to enter the inputs related to the field data. Additionally or alternatively, the inputs related to the field data may be received from a remote server 304. For example, the inputs related to the field data may be received in the form of software that can include one or more objects, agents, lines of code, threads, subroutines, databases, application programming interfaces (APIs), or other suitable data structures, source code (human-readable), object code (machine-readable). In response, the system 300 may update any input/output based on the received inputs. The application interface 310 can be implemented in hardware, software, or a suitable combination of hardware and software, and which can be one or more software systems operating on a general-purpose processor platform, a digital signal processor platform, or other suitable processors.

In some examples, at various predefined periods and/or times, the first vehicle 100, the second vehicle 200, and/or the electronic device 144 may communicate with the server 304 through the network/cloud 302 to obtain the stored instructions, if any exist. Upon receiving the stored instructions, the first vehicle 100, the second vehicle 200, and/or the electronic device 144 may implement the instructions. In some instances, the first vehicle 100, the second vehicle 200, and/or the electronic device 144 can send event-related data to the server 304 for storage in the data store 306. This collection of event-related data can be accessed by any number of users, the first vehicle 100, the second vehicle 200, and/or the electronic device 144 to assist with application processes.

In some instances, a computing device 312 may also access the server 304 to obtain information related to stored events. The computing device 312 may be a mobile device, tablet computer, laptop computer, desktop computer, watch, virtual reality device, television, monitor, or any other computing device 312 or another visual device.

In various embodiments, the data used by the first vehicle 100, the second vehicle 200, the electronic device 144, the remote server 304, the data store 306, the application 308, the application interface 310, the computing device 312, and/or any other component described herein for any purpose may be based on data provided by the one or more sensors 90, 108, 110, 112, 220 operably coupled with the first vehicle 100 and/or the second vehicle 200 and/or third-party data that may be converted into comparable data that may be used independently or in conjunction with data collected from the one or more sensors 90, 108, 110, 112, 220.

In various embodiments, based on the data collected during the first operation, the system 300 may be configured to generate a weed map 430 (FIG. 10) that illustrates a general location of one or more weeds 96 (or other detected objects) within the field 20, a prescription map 432 (FIG. 11) that generally illustrates one or more regions for which an agricultural product is to be applied, a calculated volume of the first agricultural product that is needed to treat a first region 434 (FIG. 11), a calculated volume of the second agricultural product that is needed to treat a second region 436 (FIG. 11), and/or any other information. The system 300 may include the first computing system 106 associated with the first vehicle 100, the second computing system 204 associated with the second vehicle 200, the electronic device 144, a computing system of the remote server 304, a computing system associated with the data store 306, a computing system associated with the application 308, a computing system associated with the application interface 310, and/or a computing system associated with the computing device 312. As such, in various embodiments, the information that may be produced by a computing system is remote from the first vehicle 100 and the second vehicle 200.

In various examples, the server 304 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the server 304 through the network/cloud 302 and may be used to generate a predictive evaluation of the field 20. In some instances, the machine learning engine may allow for changes to a weed map 430 and/or a prescription map 432 to be performed without human intervention.

Figure 11:
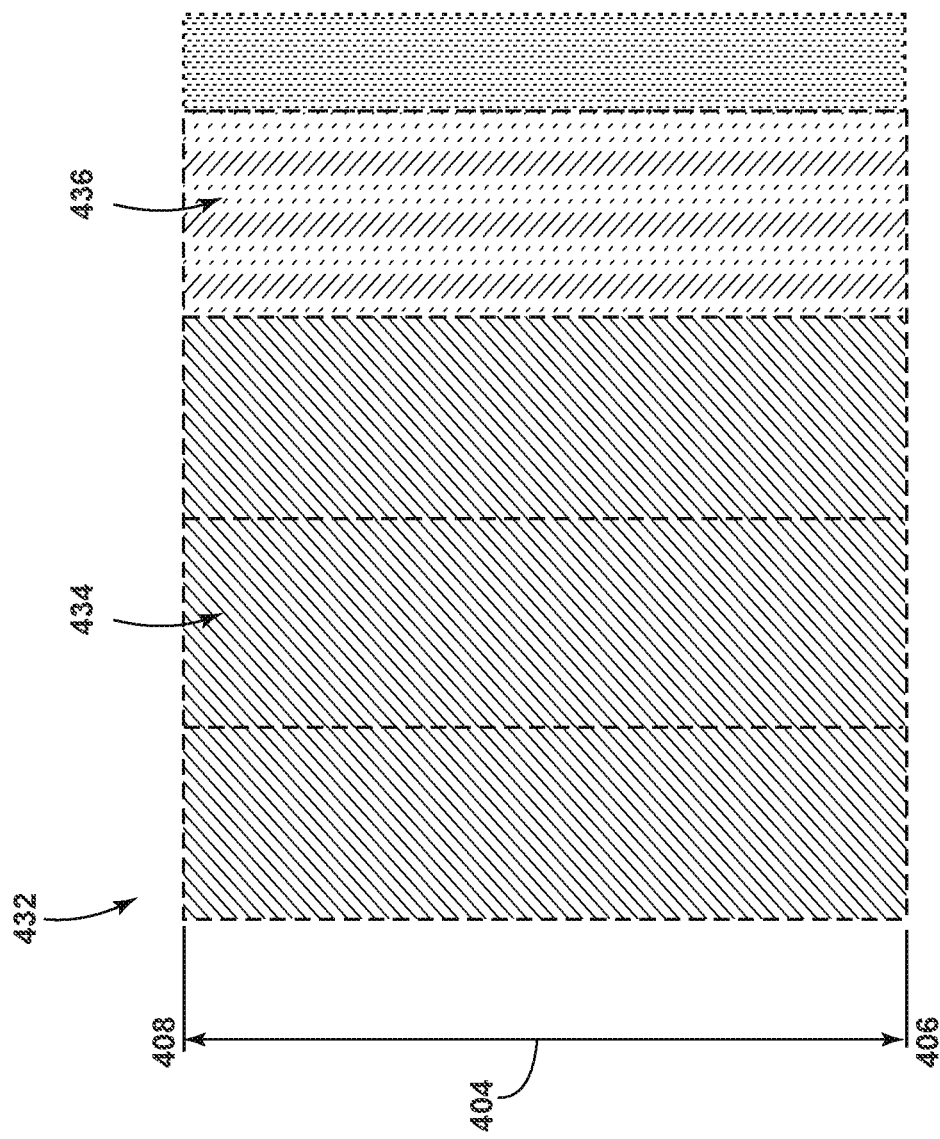
FIG. 11 illustrates a prescription map in accordance with aspects of the present subject matter.
Figure 12:
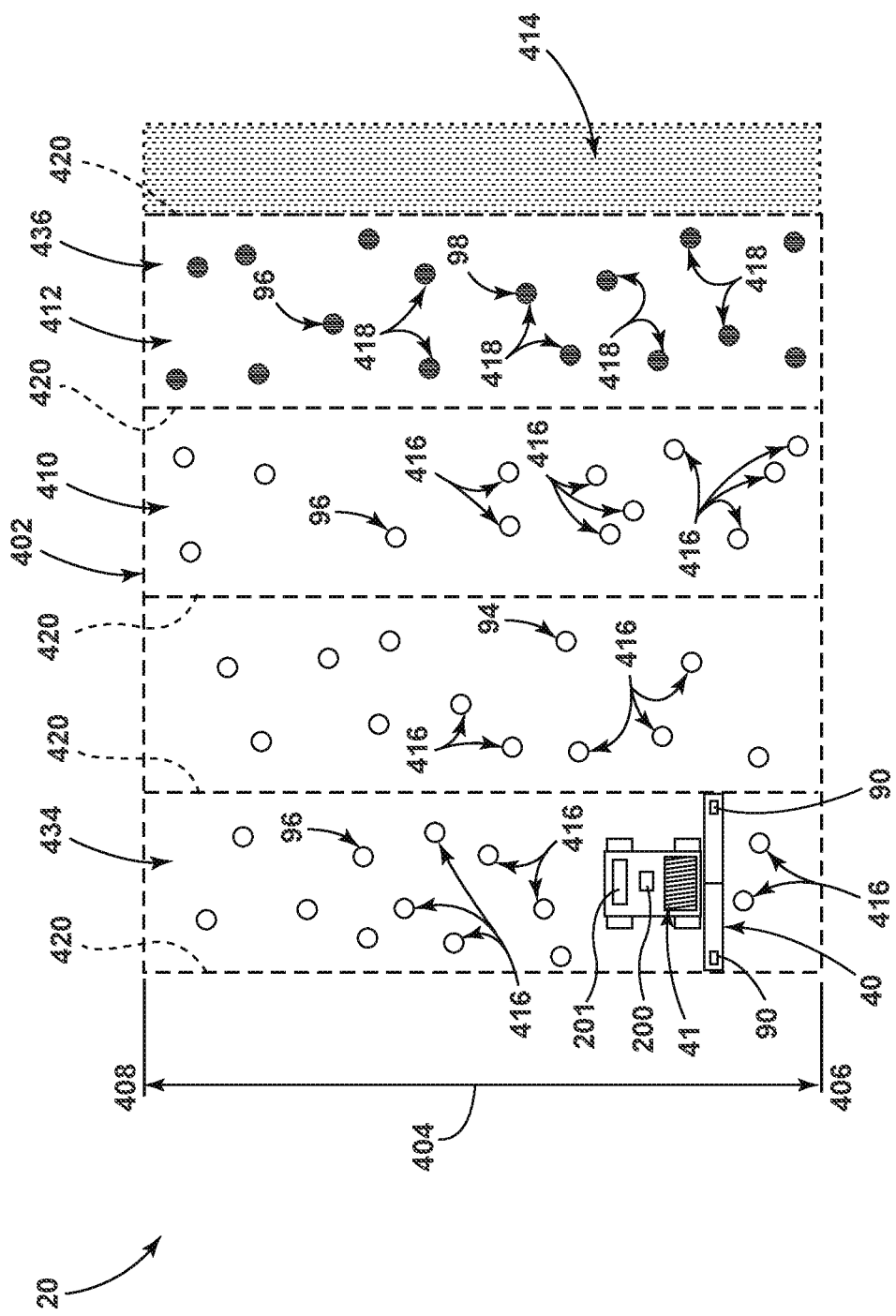
FIG. 12 is a schematic illustration of a second agricultural vehicle performing a first pass within the agricultural field in accordance with aspects of the present subject matter.
Figure 13:
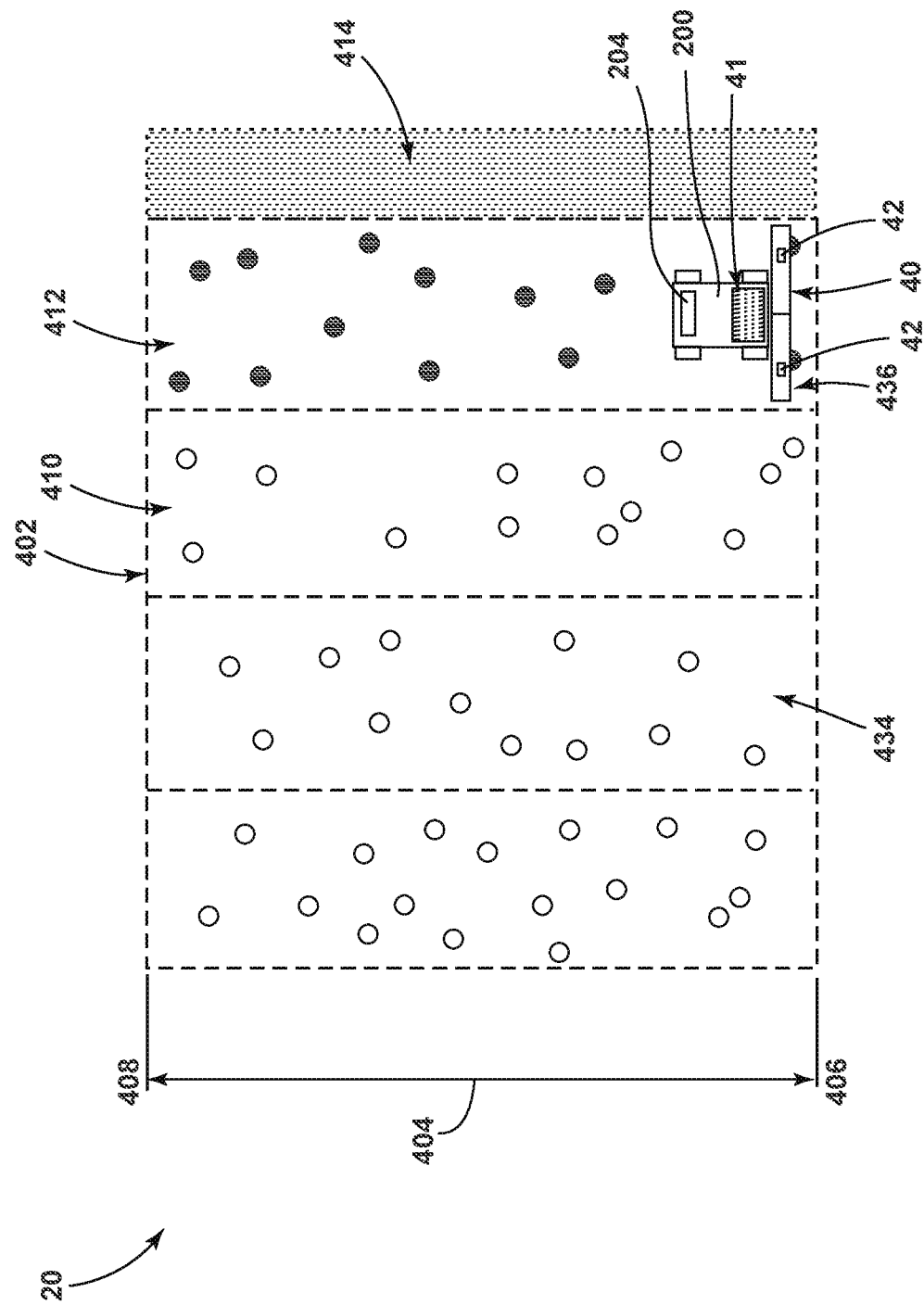
FIG. 13 is a schematic illustration of the second agricultural vehicle performing a subsequent pass within an agricultural field in accordance with aspects of the present subject matter.

With respect to FIGS. 7-13, various example embodiments of a system 300 for performing a spraying operation according to the present subject matter will be described below. Particularly, FIGS. 7-9 generally illustrate a first vehicle 100 performing a first agricultural operation in a field 20 in accordance with various examples of a work route. Additionally, FIG. 10 generally illustrates an exemplary weed map 430 in accordance with various examples of the present disclosure. FIG. 11 generally illustrates an exemplary prescription map 432 in accordance with various examples of the present disclosure. FIGS. 12 and 13 generally illustrate a second vehicle 200 selectively applying an agricultural product to one or more of the targets 94 detected by the first vehicle 100 in accordance with various examples of the present disclosure.

Figure 7:
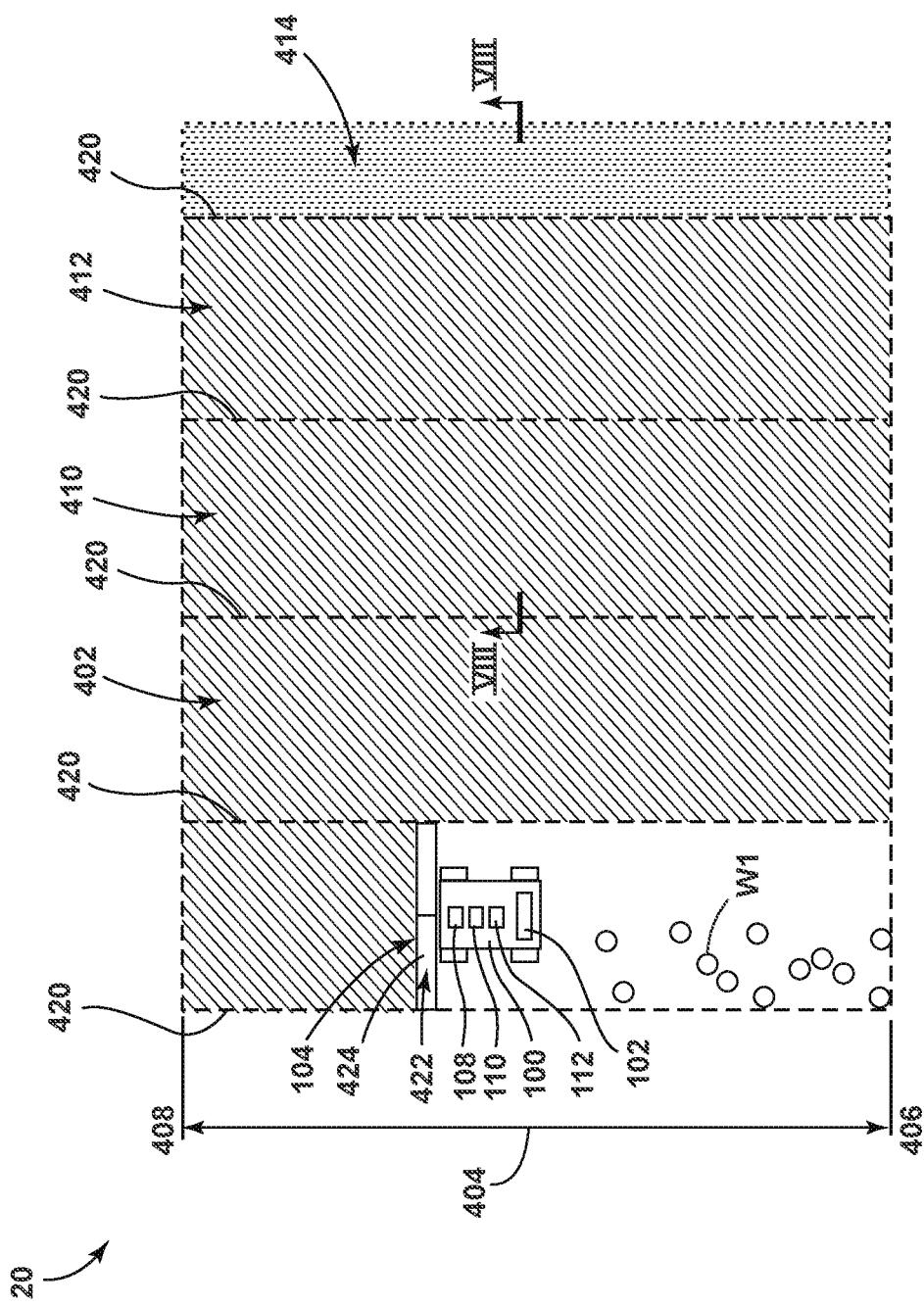
FIG. 7 is a schematic illustration of the first agricultural vehicle performing a first pass within an agricultural field in accordance with aspects of the present subject matter.
Figure 8:
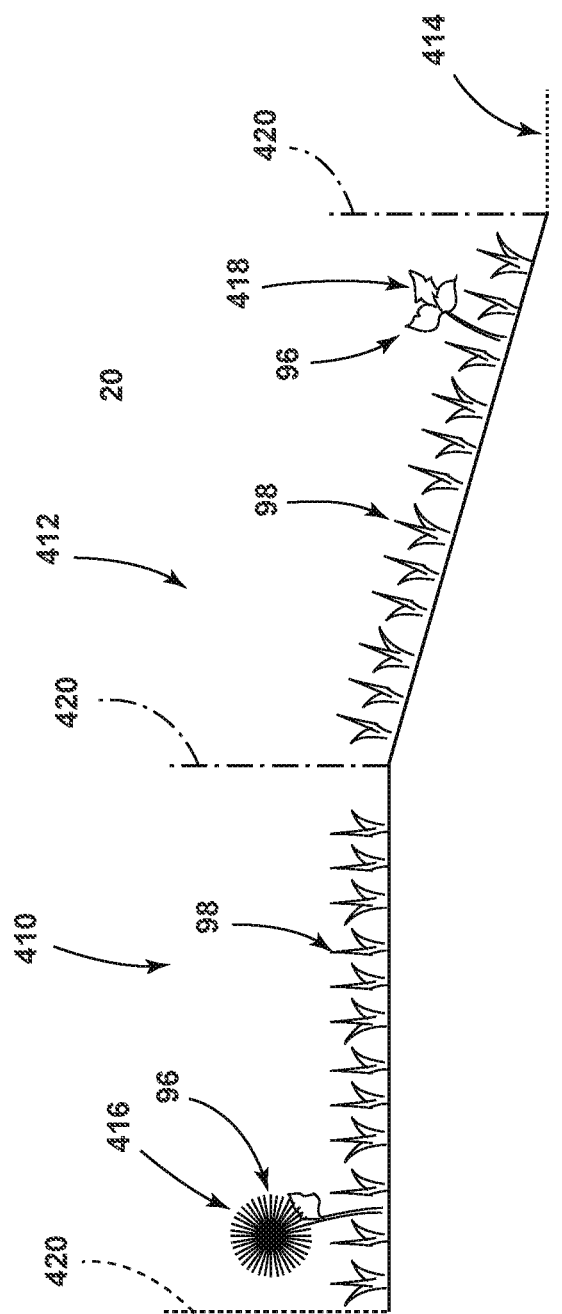
FIG. 8 illustrates a cross-sectional view of the field of FIG. 7 taken along the line VIII-VIII in accordance with aspects of the present subject matter.
Figure 9:
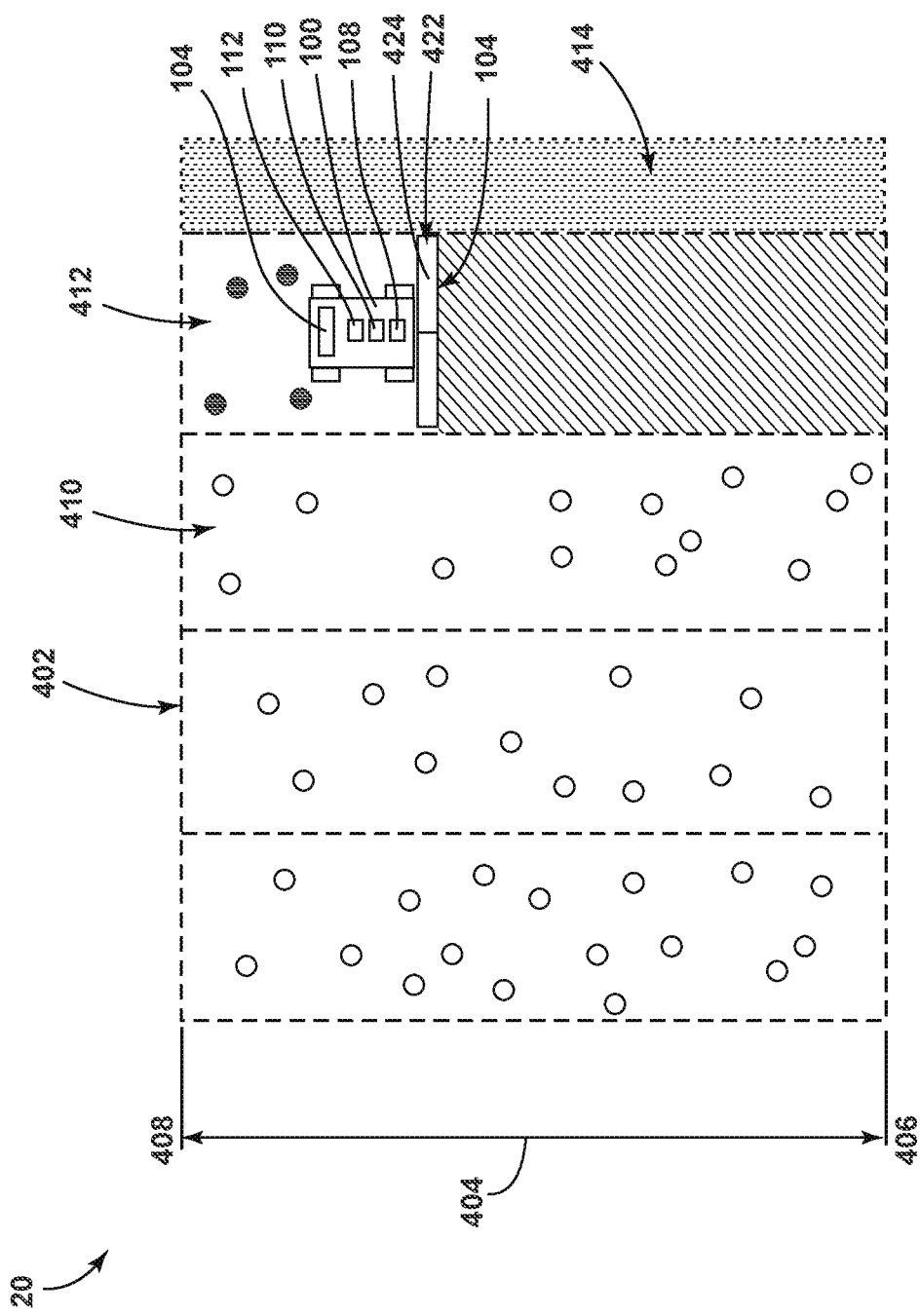
FIG. 9 is a schematic illustration of the first agricultural vehicle performing a subsequent pass within an agricultural field in accordance with aspects of the present subject matter.

With further reference to FIGS. 7-9, a first vehicle 100 is shown performing a first operation within a working area 402 of the field 20. Specifically, FIG. 7 is a schematic view of the first agricultural vehicle making a first pass within the field 20, FIG. 8 is a cross-sectional view of the field 20 taken along the line VIII-VIII of FIG. 7 illustrating a terrain variation within the field 20, and FIG. 9 is a schematic view of the first agricultural vehicle making a second pass within the field 20.

As illustrated, the working area 402 of the field 20 extends in an operating direction 404 between a first end portion 406 and a second end portion 408. In addition, the field 20 may have various portions that are at a first elevation 410 while other portions of the field 20 may be at a second elevation 412 that is varied from the first elevation 410. Further still, various features and/or obstructions may also be present within the field 20. For example, as illustrated in FIGS. 7-9, a pond 414 may be positioned along a portion of the field 20. Based on the elevation deviations and the various features within the field 20, the various portions of the field 20 may be prone to varied types of weeds 96. For instance, a first set 416 of weeds 96 (e.g., one or more types of weeds 96) may be more prevalent in higher elevation regions of the field 20 while a second set 418 of weeds 96 (e.g., one or more types of weeds 96) may be more prevalent in lower elevation regions of the field 20 and/or near features such as ponds 414.

As shown, a plurality of swath lines 420 may extend in the operating direction 404 between the first and second end portions 406, 408 of the working area 402. In general, the swath lines 420 may correspond to predetermined or pre-generated guidance lines representing anticipated or desired paths or passes across the field 20 for performing a first agricultural operation (e.g., a planting operation, a seeding operation, a tilling operation, a harvesting operation, a spraying operation, and/or any other operation). While the embodiments of FIGS. 7-9 generally illustrate and describe the first vehicle 100 being configured as a harvester, it will be appreciated that the first vehicle 100 may be configured as tractor, harvester, self-propelled windrower, self-propelled sprayer, drone, and/or the like. In addition, it will be appreciated that the first vehicle 100 may be human-controlled, autonomously controlled, and/or semi-autonomously controlled without departing the scope of the present disclosure.

With further reference to FIGS. 7-9, while the first operation is performed by moving the first vehicle 100 through each swath line 420, the object sensor 108 associated with or installed on the first agricultural vehicle may be configured to detect objects (e.g., plants, weeds 96, etc.) in a portion of the field 20. For example, while the first vehicle 100 makes each pass within a swath 54 of the field 20, the first vehicle 100 may harvest a crop 98 within the swath 54 of the field 20. In some examples, the first vehicle 100 may include a feeding system 422 having a header 424 and a threshing and separation system. As the crop material flows through the threshing and separation system, the crop material including, for example, grain, straw, legumes, and the like, will be loosened and separated from crop residue or MOG (material other than grain) such as, for example, weeds 96, husks, cobs, pods, and the like, and the separated materials may be carried away from the threshing and separation system. The crop residue may then be redistributed to the field 20 via a spreader.

As the crop 98 is separated from the crop residue, the object sensor 108 may capture data indicative of one or more weeds 96 within the spreader and/or within the field 20. For example, the object sensor 108 may capture data related to one or more weeds 96 within a component of the vehicle before the crop residue being exhausted from the first vehicle 100. Additionally or alternatively, the object sensor 108 may capture data related to the underlying field 20. In various examples, the object sensor 108 may be operably coupled with a first computing system 106, which may store the data. In addition to the object sensor 108, the first vehicle 100 may also include a terrain sensor 110 that is configured to capture data indicative of the terrain of the field 20.

Still further, in some embodiments, when an object is detected based on data from the object sensor 108 and/or a terrain condition is detected based on data provided by the terrain sensor 110, the system 300 may correlate the object and/or terrain condition to a defined location based on the information provided by the positioning system 220.

With further reference to FIGS. 7-9, in operation, while harvesting the crop 98, one or more objects may be detected by the object sensor 108 within the crop residue and/or within the field 20. The location of each object may be stored by the first computing system 106. In addition, the terrain sensor 110 may capture data related to terrain variations within the field 20. The location of each terrain variation may also be stored within the system 300.

Figure 10:
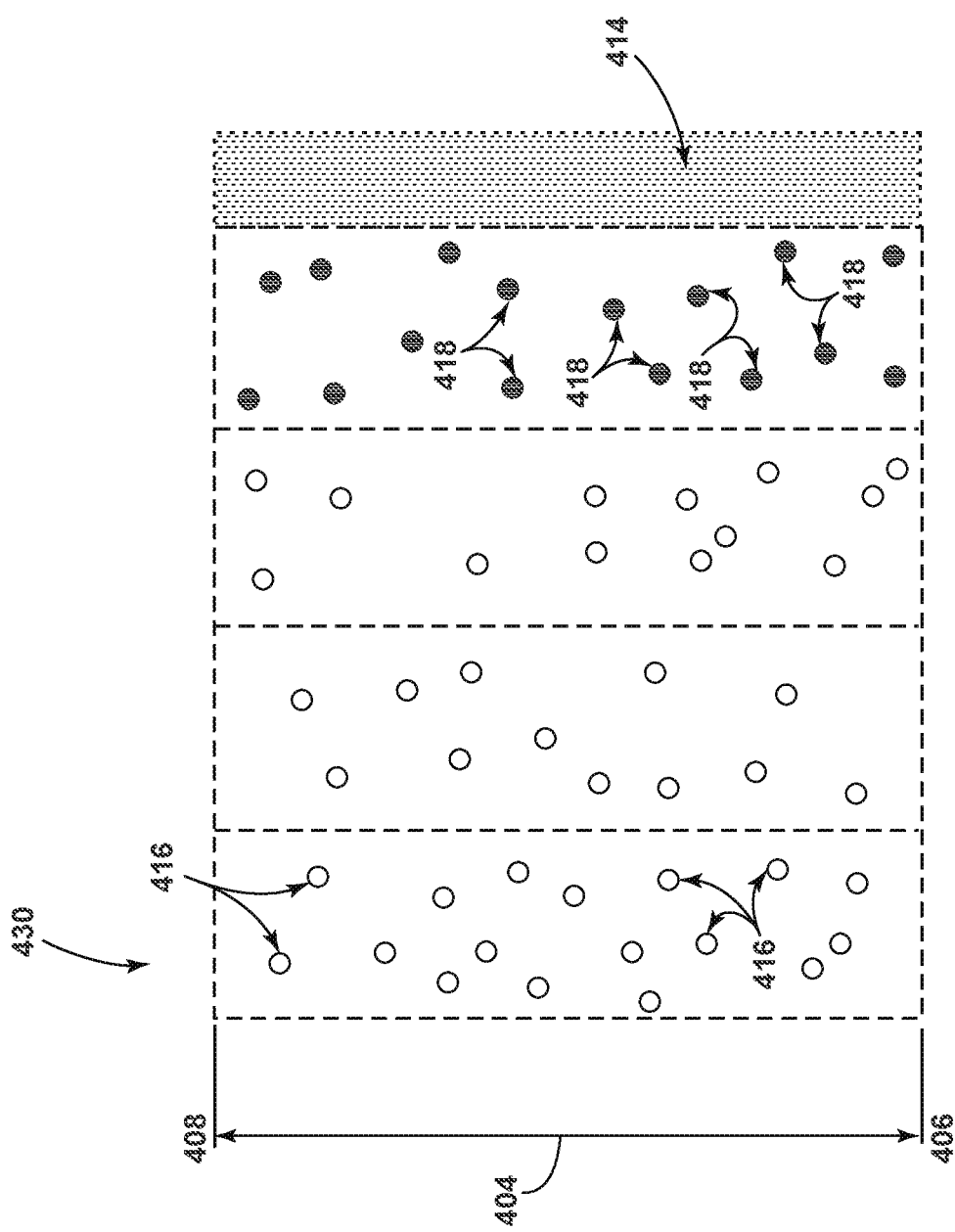
FIG. 10 illustrates a weed map in accordance with aspects of the present subject matter.

Referring now to FIG. 10, based on the data from the object sensor 108, the data from the terrain sensor 110, and/or the data from the positioning device 112, the system 300 may generate a weed map 430. The weed map 430 may generally illustrate a position and/or a density of weeds 96 within the various regions of the field 20.

In addition, based on the terrain variations, the data from the object sensor 108, and/or inputted data, the system 300 may predict a type of weed 96 within the various portions of the field 20. For example, as provided herein, a first type of weed 96 may be more prevalent in a higher elevation region of the field 20 while a second type of weed 96 may be more prevalent in lower elevation regions of the field 20 and/or near features such as ponds 414.

In various embodiments, due to the various weeds 96 being identified within various regions of the field 20, a vehicle path of the second vehicle 200 can be varied from a path of the first vehicle 100 based on the weed map 430. For instance, the first vehicle 100 may generally align with the swaths 54 illustrated in FIG. 7 as the first vehicle 100 traverses the field 20. Conversely, the second vehicle 200 may initiate its operation based on the agricultural product within the product tank 36 and/or a location of more or more defined targets 94.

Referring to FIG. 11, based on the weed map 430 and/or the identified weeds 96, the system 300 may generate a prescription map 432. In general, the first weed type may be treated by a first agricultural product while the second weed type may be treated by a second agricultural product. As such, the system 300 may identify a first region 434 in which the first agricultural product may be applied to those regions of the field 20. Likewise, the system 300 may identify a second region 434 in which the second agricultural product may be applied to those regions of the field 20.

In some embodiments, based on the number of weeds 96 within the first region 434, the density of weeds 96 within the first region 434, the area of the first region 434, and/or any other metric, the system 300 may determine a calculated volume of the first agricultural product that is needed to treat the first region 434. The calculated volume of the first agricultural product may additionally be dependent on other factors as well, including a suggested concentration of the first agricultural product, a suggested application rate of the agricultural product, and so on.

Similarly, in various embodiments, based on the number of weeds 96 within the second region 434, the density of weeds 96 within the second region 434, the area of the second region 434, and/or any other metric, the system 300 may determine a calculated volume of the second agricultural product that is needed to treat the second region 434. The calculated volume of the second agricultural product may additionally be dependent on other factors as well, including a suggested concentration of the second agricultural product, a suggested application rate of the agricultural product, and so on.

In some embodiments, the system 300 may determine whether the first agricultural product or the second agricultural product is within a product tank 36 of the second vehicle 200. In turn, the system 300 may generate a first vehicle path when the first agricultural product is within the product tank 36 of the second vehicle 200 and generate a second vehicle 200 path when the first agricultural product is within the product tank 36 of the second vehicle 200.

Referring now to FIGS. 12 and 13, a second vehicle 200 may traverse the field 20 based on information provided within the weed map 430 and/or the prescription map 432. As illustrated, the second vehicle 200 may be configured as a sprayer 10 that includes the agricultural product application system 206, which may be configured to transfer an agricultural product from the product system 41 to the field 20 through one or more nozzle assemblies 42. As provided herein, the nozzle assemblies 42 may be positioned at least partially along the boom assembly 40 and/or along various other portions of the sprayer 10.

In some instances, as the sprayer 10 traverses the field 20, the computing system 204 of the second vehicle 200 may be configured to distinguish various objects within the field 20 (e.g., weeds 96 from useful plants). In such instances, the system 300 may perform a spraying operation to selectively spray or treat the defined targets 94 from the nozzle 44 based on the target 94 being positioned within an application region 88 (FIG. 3) of the respective nozzle assembly 42.

In some cases, the application system 206 of the sprayer 10 may include a first agricultural product that is to be used within the first region 434 of the field 20. Alternatively, as illustrated in FIG. 13, the application system 206 of the sprayer 10 may include a second agricultural product that is to be used within the second region 434 of the field 20. As such, the prevalent weeds 96 of various portions of the field 20 made be treated more effectively thereby increasing the efficiency of the spraying operation. In addition, the system 300 may reduce an amount of agricultural product stored in the tank of the sprayer 10 as the system 300 may proactively estimate a calculated volume based on the previously detected conditions of the field 20.

Figure 14:
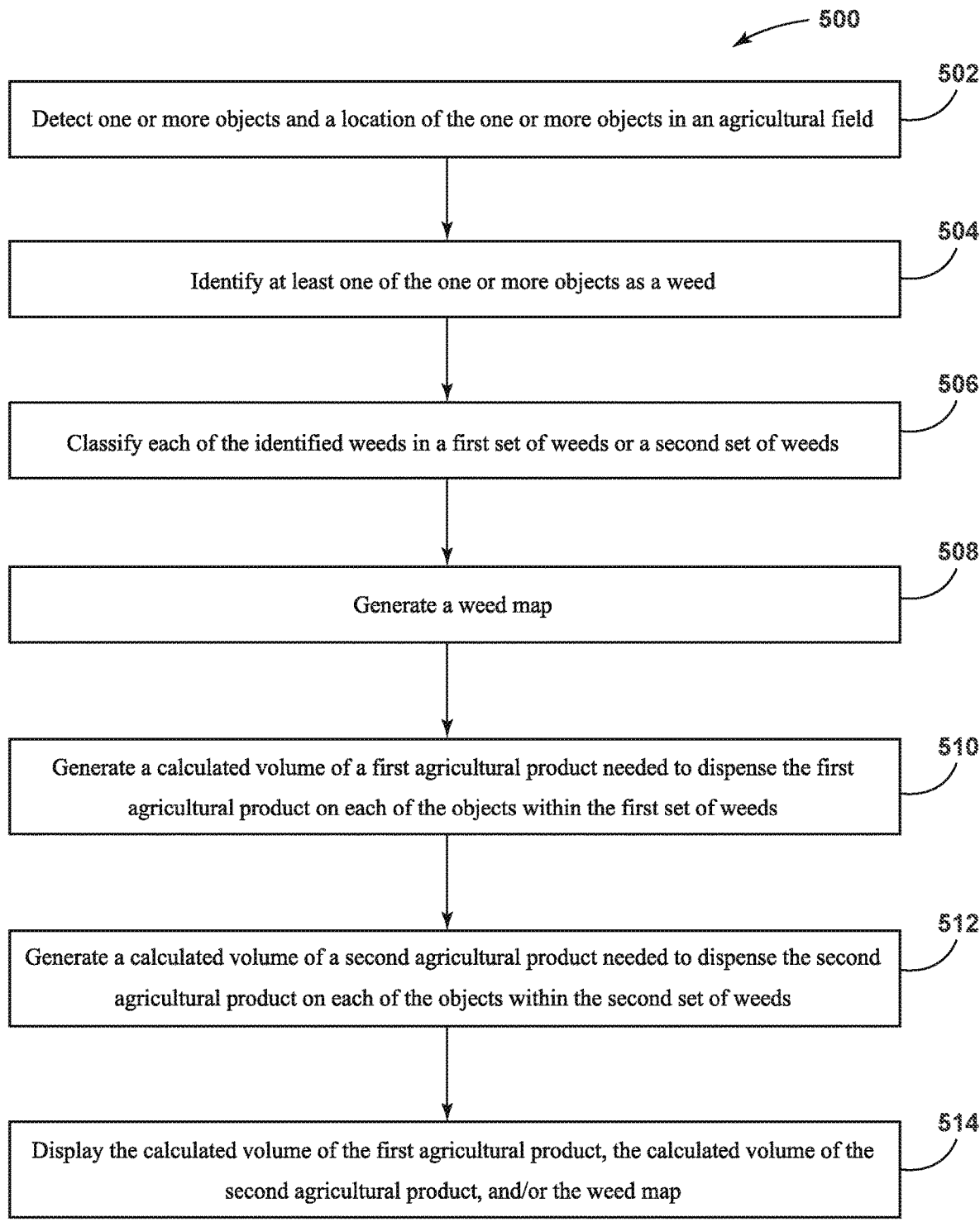
FIG. 14 illustrates a flow diagram of a method of selectively applying an agricultural product in accordance with aspects of the present subject matter.

Referring now to FIG. 14, a flow diagram of some embodiments of a method 500 for selectively applying an agricultural product is illustrated in accordance with aspects of the present subject matter. In general, the method 500 will be described herein with reference to the first vehicle 100, the second vehicle 200, and the network/cloud 302 described above with reference to FIGS. 1-13. However, it will be appreciated by those of ordinary skill in the art that the disclosed method 500 may generally be utilized with any suitable agricultural vehicle and/or may be utilized in connection with a system having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (502), the method 500 can include detecting one or more objects and a location of the one or more objects in an agricultural field. In some instances, the one or more objects may be detected by an object sensor associated with a first agricultural vehicle. In addition, the detection may occur while the first vehicle performs a first agricultural operation.

At (504), the method 500 can include identifying at least one of the one or more objects as a weed. In some instances, a computing system may be used to analyze/process the data from the first vehicle to detect/identify the type and location of various objects in the field. In this regard, the computing system may include any suitable image processing algorithms stored within its memory or may otherwise use any suitable image processing techniques to determine, for example, the presence and locations of objects within the field based on the received sensor data. For instance, in some embodiments, the computing system may be able to distinguish between weeds and emerging/standing crops. Additionally or alternatively, in some embodiments, the computing system may be configured to distinguish between weeds and emerging/standing crops, such as by identifying crop rows of emerging/standing crops and then inferring that plants positioned between adjacent crop rows are weeds.

At (506), the method 500 can include classifying each of the identified weeds in a first set of weeds or a second set of weeds. As provided herein, the object sensor may provide image or image-like data to a computing system. In turn, the computing system may analyze the data to determine the classification of each weed.

In addition, in some instances, classifying each of the identified weeds within the first set of weeds or the second set of weeds can be at least based in part on a detected terrain condition proximate to the detected one or more objects. The terrain conditions can be at least one of a soil compaction level, a soil percent moisture, a field residue levels/amounts, a field traffic, a soil type, a soil composition, a topsoil depth, a subsoil depth, a field elevation, a tire traction, and/or any other suitable condition that affects the performance of a seeder to deposit one or more seeds at a target deposition depth or target depth range. Based on the terrain condition deviations and various features within the field, such as ponds, various portions of the field may be prone to varied types of weeds. For instance, a first type of weed may be more prevalent in a higher elevation portion of the field while a second type of weed may be more prevalent in lower elevation portions of the field and/or near features such as ponds. As such, the terrain conditions may be used to classify the identified weeds into the first set of weeds or the second set of weeds.

As (508), the method 500 can include generating a weed map to generally illustrate the location of the first set of weeds and/or the second set of weeds. In general, the weed map may provide any design for providing the general location of the weeds within the field. In some examples, the weed map may additionally or alternatively include various regions upon which a specific set or type of weed is above a threshold amount. For example, a first region can include at least a first minimum threshold of a first type of weed and a second region can include at least a second minimum threshold of a second type of weed. The first minimum threshold and the second minimum threshold may relate to the percentage of weeds of a specific type related to the remaining types within the region, the number of weeds of the specific type, the size of the specific type of weed-related to the remaining weeds within the region, and/or any other practicable metric.

At (510), the method 500 can include generating a calculated volume of a first agricultural product needed to dispense the first agricultural product on each target within the first set of weeds. As provided herein, based on the number of weeds within the first region, the density of weeds within the first region, the area of the first region, and/or any other metric, the system may determine a calculated volume of the first agricultural product that is needed to treat the first region. The calculated volume of the first agricultural product may additionally be dependent on other factors as well, including a suggested concentration of the first agricultural product, a suggested application rate of the agricultural product, and so on.

Similarly, at (512), the method 500 can include generating a calculated volume of a second agricultural product needed to dispense the second agricultural product on each target within the second set of weeds. In various embodiments, based on the number of weeds within the second region, the density of weeds within the second region, the area of the second region, and/or any other metric, the system may determine a calculated volume of the second agricultural product that is needed to treat the second region. The calculated volume of the second agricultural product may additionally be dependent on other factors as well, including a suggested concentration of the second agricultural product, a suggested application rate of the agricultural product, and so on.

At (514), the method 500 can include displaying the calculated volume of the first agricultural product, the calculated volume of the second agricultural product, and/or the weed map on a user interface. In some instances, the user interface may be positioned within a second vehicle. In turn, the second vehicle may be filled to the calculated volume of the first agricultural product and/or the calculated volume of the second agricultural product to selectively apply respective first and second agricultural products to the first and second regions of the field.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural operation, the system comprising:
   a first vehicle having an object sensor configured to capture data associated with one or more objects within a field and a location sensor configured to capture data associated with a location of each of the one or more objects;
   a second vehicle for depositing an agricultural product; and
   a computing system communicatively coupled with the object sensor and the location sensor, the computing system configured to:
   identify at least one of the one or more objects as a weed;
   classify each of the identified weeds in a first set of weeds or a second set of weeds based on a terrain condition proximate to the identified weed;

generate a weed map based on the classification of each of the first set of weeds and the second set of weeds, wherein the weed map includes a first region associated with the first set of weeds and a second region associated with the second set of weeds, and wherein the first region includes at least a first minimum threshold of a first type of weed and the second region includes at least a second minimum threshold of a second type of weed;

wherein the second agricultural vehicle is configured to deposit the agricultural product according to the generated weed map.

2. The system of claim 1, wherein:
the second vehicle includes a boom assembly having one or more nozzle assemblies positioned along the boom assembly.

3. The system of claim 2, wherein a first agricultural product is configured to be deposited on the first set of weeds within the first region from the one or more nozzle assemblies and a second agricultural product is configured to be deposited on the second set of weeds within the second region from the one or more nozzle assemblies during operation of the second vehicle.

4. The system of claim 2, wherein a vehicle path of the second vehicle is varied from a vehicle path of the first vehicle based on the weed map.

5. A method for selectively depositing an agricultural product, the method comprising:
detecting, with a computing system, one or more objects and a location of the one or more objects in an agricultural field;
identifying, with the computing system, at least one of the one or more objects as a weed;
classifying, with the computing system, each of the identified weeds in a first set of weeds or a second set of weeds based, at least in part, on a detected terrain condition proximate to the identified weed;
generating, with the computing system, a calculated volume of a first agricultural product needed to be deposited on each target within the first set of weeds; and
controlling, with the computing system, an operation of a vehicle to deposit the first agricultural product according to the generated calculated volume of the first agricultural product.

6. The method of claim 5, further comprising:
displaying, with a user interface, the calculated volume of the first agricultural product.

7. The method of claim 5, further comprising:
generating, with the computing system, a calculated volume of a second agricultural product needed to be deposited on each target within the second set of weeds.

8. The method of claim 5, further comprising:
generating, with the computing system, a weed map to illustrate the location of the one or more objects within the field.

9. A system for an agricultural operation, the system comprising:
a first vehicle having an object sensor configured to capture data associated with one or more objects within a field and a location sensor configured to capture data associated with a location of each of the one or more objects;
a second vehicle for depositing an agricultural product; and
a computing system communicatively coupled with the object sensor and the location sensor, the computing system configured to:
identify at least one of the one or more objects as an identified weed;
classify each of the identified weeds in a first set of weeds or a second set of weeds based on a terrain condition proximate to the identified weed; and
generate a weed map based on the classification of each of the first set of weeds and the second set of weeds, wherein the weed map includes a first region associated with the first set of weeds and a second region associated with the second set of weeds;
wherein the second agricultural vehicle is configured to deposit the agricultural product according to the generated weed map.

10. The system of claim 9, wherein the first vehicle further includes a terrain sensor, and wherein the computing system is configured to classify each of the identified weeds in a first set of weeds or a second set of weeds based in part on data received from the terrain sensor.

11. The system of claim 9, wherein the first vehicle is configured to perform at least one of a planting process, seeding process, a tilling process, or a harvesting process during operation of the first vehicle.

12. The system of claim 9, wherein the computing system is further configured to:
determine whether a first agricultural product or a second agricultural product is within a product tank of the second vehicle;
generate a first vehicle path when the first agricultural product is within the product tank of the second vehicle; and
generate a second vehicle path when the first agricultural product is within the product tank of the second vehicle.

13. The system of claim 9, wherein the computing system is remote from the first vehicle and the second vehicle.

14. The system of claim 9, wherein the computing system is configured to:
generate a calculated volume of a first agricultural product needed to be deposited on each target within a first set of weeds.

15. The system of claim 14, wherein the calculated volume of the first agricultural product is based in part on a density of weeds within the first region.

16. The system of claim 9, wherein the computing system is further configured to generate a prescription map based on the first set of weeds within the first region and the second set of weeds within the second region.

17. The system of claim 16, wherein:
the second vehicle includes a boom assembly having one or more nozzle assemblies positioned along the boom assembly, the second vehicle configured to deposit a first agricultural product on the first set of weeds within the first region and a second agricultural product on the second set of weeds within the second region.

18. The system of claim 17, wherein the computing system is integrated within the second vehicle.

19. The system of claim 18, further comprising:
a positioning device operably coupled with the first vehicle and configured to provide data to the first vehicle for geo-locating each of the objects classified as weeds.

20. The system of claim 9, wherein the computing system is further configured to:
control the operation of the second vehicle to deposit the agricultural product according to the generated weed map.

* * * * *